United States Patent
Kaneko et al.

(10) Patent No.: US 8,205,489 B2
(45) Date of Patent: Jun. 26, 2012

(54) KNOCKING DETERMINATION DEVICE AND KNOCKING DETERMINATION METHOD FOR INTERNAL COMBUSTION ENGINE

(75) Inventors: Rihito Kaneko, Nishikamo-gun (JP); Kenji Kasashima, Nishikamo-gun (JP); Masatomo Yoshihara, Toyota (JP); Kenji Senda, Okazaki (JP); Norihito Hanai, Toyota (JP); Yasuhiro Yamasako, Toyota (JP); Yuichi Takemura, Toyohashi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 315 days.

(21) Appl. No.: 12/602,286

(22) PCT Filed: May 27, 2008

(86) PCT No.: PCT/JP2008/060118
§ 371 (c)(1),
(2), (4) Date: Mar. 3, 2010

(87) PCT Pub. No.: WO2008/149832
PCT Pub. Date: Dec. 11, 2008

(65) Prior Publication Data
US 2010/0162795 A1 Jul. 1, 2010

(30) Foreign Application Priority Data
May 30, 2007 (JP) .................................. 2007-143883

(51) Int. Cl.
*G01L 23/22* (2006.01)
(52) U.S. Cl. .................. 73/114.07; 73/35.01; 73/35.09; 73/35.11; 73/114.01
(58) Field of Classification Search ............... 73/35.01, 73/35.03, 35.04, 35.06, 35.09, 35.11, 114.01, 73/114.07
See application file for complete search history.

(56) References Cited

U.S. PATENT DOCUMENTS
5,230,316 A * 7/1993 Ichihara et al. .......... 123/406.38
(Continued)

FOREIGN PATENT DOCUMENTS
CN 101479587 A 7/2009
(Continued)

OTHER PUBLICATIONS
Office Action issued Jan. 1, 2009, in Pakistani Patent Application No. 588/2008.
(Continued)

*Primary Examiner* — David Rogers
(74) *Attorney, Agent, or Firm* — Oblon, Spivak, McClelland, Maier & Neustadt, L.L.P.

(57) ABSTRACT

An engine ECU executes a program including: detecting a magnitude of vibration of an engine; detecting a vibration waveform of the engine based on the magnitude; calculating a correlation coefficient, in the case where the engine speed is smaller than a threshold value, using the sum of values each determined by subtracting a positive reference value from a magnitude of a knock waveform model, as an area of the knock waveform model and, calculating the correlation coefficient, in the case where the engine speed is not smaller than the threshold value, using the area of the whole knock waveform model; and determining whether or not knocking has occurred using the correlation coefficient. The correlation coefficient is calculated by dividing by the area the sum of differences that are each the difference between the magnitude on the vibration waveform and the magnitude on the knock waveform model.

27 Claims, 20 Drawing Sheets

U.S. PATENT DOCUMENTS

| | | | |
|---|---|---|---|
| 6,446,601 B1 * | 9/2002 | Franke et al. | 123/406.33 |
| 2001/0052336 A1 * | 12/2001 | Tanaya et al. | 123/406.29 |
| 2004/0074476 A1 * | 4/2004 | Uchida et al. | 123/406.38 |
| 2004/0260453 A1 | 12/2004 | Sauler et al. | |
| 2005/0000277 A1 * | 1/2005 | Giles | 73/120 |
| 2005/0234633 A1 * | 10/2005 | Takemura et al. | 701/111 |
| 2006/0106523 A1 * | 5/2006 | Ancimer | 701/111 |
| 2006/0136117 A1 * | 6/2006 | Kaneko et al. | 701/111 |
| 2006/0142925 A1 * | 6/2006 | Kaneko et al. | 701/111 |
| 2007/0000307 A1 * | 1/2007 | Yoshihara et al. | 73/35.09 |

FOREIGN PATENT DOCUMENTS

| | | |
|---|---|---|
| EP | 0 281 377 A2 | 9/1988 |
| EP | 0 454 486 | 10/1991 |
| GB | 2 154 657 A | 9/1985 |
| JP | 11 270400 | 10/1999 |
| JP | 2004-138032 | 5/2004 |
| JP | 2005-307753 | 11/2005 |
| JP | 2005 330954 | 12/2005 |
| JP | 2006-177259 | 7/2006 |
| JP | 2006-177319 | 7/2006 |
| JP | 2007-9813 | 1/2007 |
| KR | 10-2002-0030810 | 4/2002 |
| RU | 2 214 586 C1 | 10/2003 |
| RU | 2 222 710 C2 | 1/2004 |
| RU | 2 297 608 C2 | 4/2007 |
| SU | 907291 A1 | 2/1982 |
| SU | 1513378 A1 | 10/1989 |
| TW | I233482 | 6/2005 |
| TW | I287216 | 9/2007 |
| WO | WO 2007/004597 A1 | 1/2007 |
| WO | 2008 001939 | 1/2008 |

OTHER PUBLICATIONS

Chinese Office Action issued on Apr. 15, 2011 in corresponding Chinese Application No. 200880018038.4 (with an English Translation).

Office Action issued Jul. 27, 2011, in Russian Patent Application No. 2009149320/07/(072932) with English translation.

Office Action issued on Sep. 14, 2011 in the corresponding Korean Application No. 2009-7024304 (with English Translation).

Office Action issued Sep. 30, 2011 in Taiwan Application No. 097119739.

* cited by examiner

F I G. 1
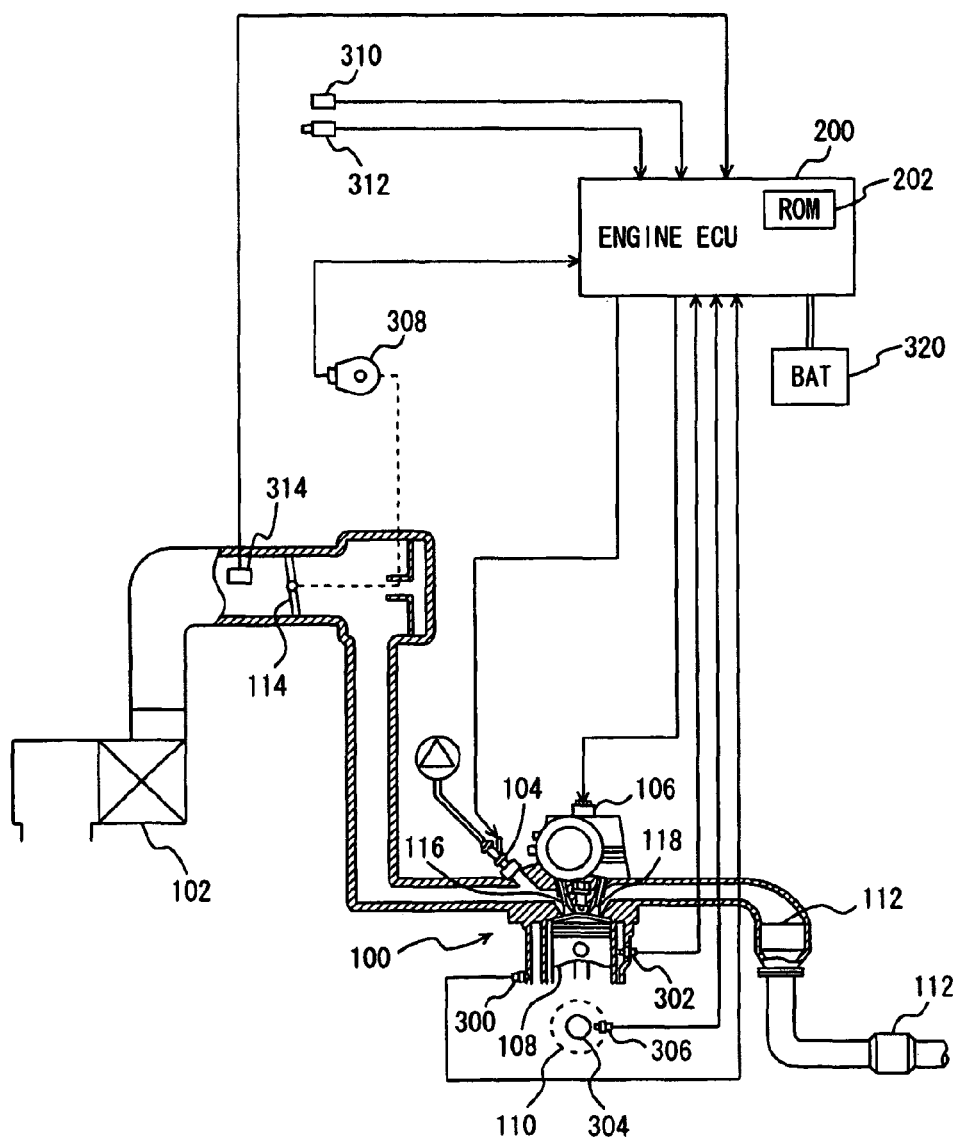

F I G. 1 1
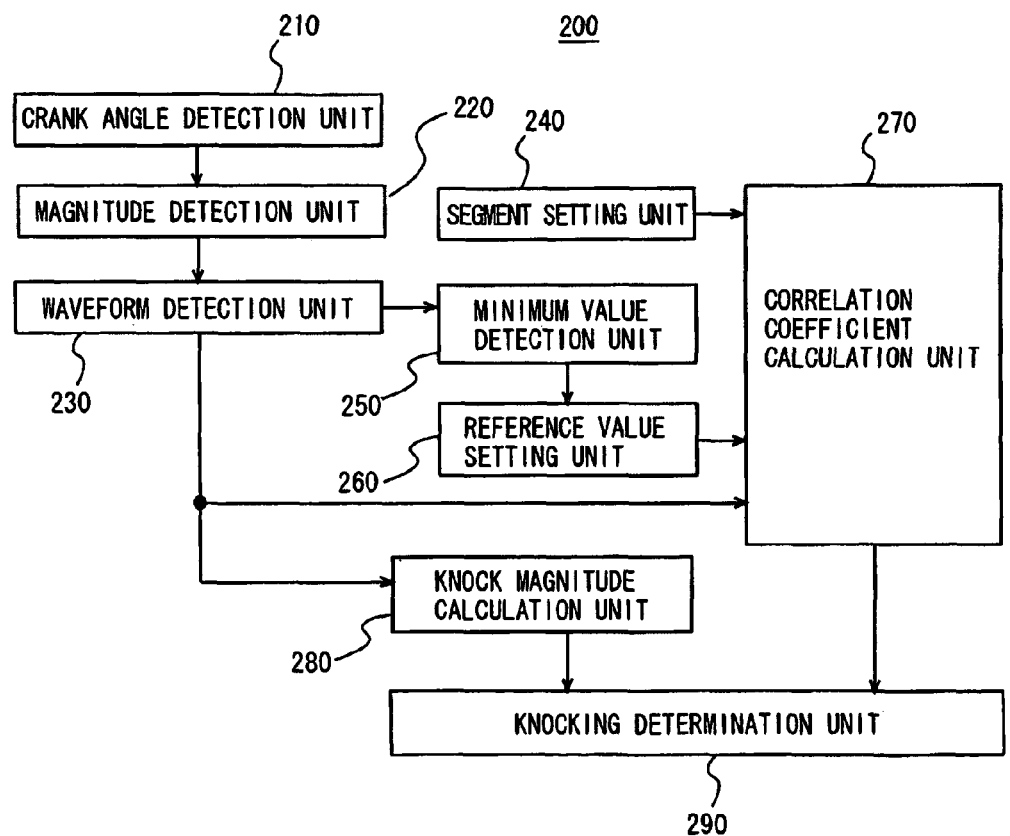

KNOCKING DETERMINATION DEVICE AND KNOCKING DETERMINATION METHOD FOR INTERNAL COMBUSTION ENGINE

TECHNICAL FIELD

The present invention relates to a knocking determination device and a knocking determination method for an internal combustion engine, and particularly to the technique of determining whether knocking has occurred or not based on a waveform of vibration of the internal combustion engine.

BACKGROUND ART

Various methods for detecting knocking (knock) occurring in an internal combustion engine have been proposed. For example, a technique determines that knocking has occurred when the magnitude of vibration of the internal combustion engine is larger than a threshold value. There is a case, however, where the magnitude of noise such as vibration that occurs when an intake valve or an exhaust valve for example closes is larger than the threshold value despite the fact that knocking has not occurred. In this case, although knocking has not occurred, it could be erroneously determined that knocking has occurred. Accordingly, a technique has been proposed that determines whether knocking has occurred or not based on the waveform of vibration, in order to consider characteristics other than the magnitude such as the crank angle at which the vibration occurs and the damping rate.

Japanese Patent Laying-Open No. 2005-330954 discloses a knocking determination device for an internal combustion engine that uses the waveform of vibration to precisely determine whether or not knocking has occurred. The knocking determination device disclosed in Japanese Patent Laying-Open No. 2005-330954 includes a crank angle detection unit for detecting a crank angle of the internal combustion engine, a vibration detection unit for detecting a value relevant to the magnitude of vibration of the internal combustion engine, a waveform detection unit for detecting a waveform of vibration of the internal combustion engine in a predetermined range of the crank angle, based on a value determined by dividing the value relevant to the magnitude of vibration by a maximum one of the detected values relevant to the magnitude of vibration, a storage unit for storing in advance a waveform of vibration of the internal combustion engine, and a determination unit for determining whether or not knocking has occurred in the internal combustion engine, based on a result of comparison between the detected waveform and the stored waveform. The determination unit determines whether or not knocking has occurred based on a value representing a deviation of the detected waveform from the stored waveform. The value representing the deviation is calculated by dividing the sum of differences which are each a difference between a magnitude on the detected waveform and a magnitude on the stored waveform determined for each crank angle, by a value determined by integrating the magnitude on the stored waveform by the crank angle.

Regarding the knocking determination device disclosed in the above-referenced publication, the crank angle detection unit detects the crank angle of the internal combustion engine, the vibration detection unit detects a value relevant to the magnitude of vibration, the waveform detection unit detects the waveform of vibration of the internal combustion engine in a predetermined range of the crank angle, based on the value relevant to the magnitude (intensity) of vibration. The storage unit stores in advance the waveform of vibration of the internal combustion engine, and the determination unit determines whether knocking has occurred or not in the internal combustion engine, based on the result of comparison between the detected waveform and the stored waveform. Thus, a knock waveform model, which is a waveform of vibration when knocking occurs, is prepared through experiments or the like for example and stored in advance, and the knock waveform model and the detected waveform are compared with each other. In this way, whether or not knocking has occurred can be determined. Accordingly, whether or not any vibration of the engine is vibration due to knocking can be analyzed in more detail. Consequently, it can be determined precisely whether or not knocking has occurred.

The knocking determination device disclosed in Japanese Patent Laying-Open No. 2005-330954, however, detects a waveform that is normalized by dividing the value relevant to the magnitude of vibration by its maximum value. Therefore, regardless of whether the detected magnitude is large or small, the maximum magnitude on the detected waveform is "1" all the time. Thus, even if the original magnitude before being divided by the maximum value is small, the value representing the deviation of the waveform is likely to be a value which seems to represent knocking if the shape of the detected waveform is similar to the shape of the stored waveform. This is for the following reason. The value determined by integrating the magnitude on the stored waveform by the crank angle, namely the area of the stored waveform is relatively larger than the difference between the magnitude on the detected waveform and the magnitude on the stored waveform, and thus the influence of the difference in magnitude is relatively small. Then, it could be erroneously determined that knocking has occurred, despite the fact that knocking has not occurred.

DISCLOSURE OF THE INVENTION

An object of the present invention is to provide a knocking determination device and a knocking determination method for an internal combustion engine with which whether or not knocking has occurred can be precisely determined.

According to an aspect of the present invention, a knocking determination device for an internal combustion engine includes: a crank position sensor detecting a crank angle of the internal combustion engine; a knock sensor detecting a magnitude of vibration of the internal combustion engine, the magnitude being associated with a crank angle; and an operation unit. The operation unit detects a waveform of vibration in a first interval of crank angle, based on the magnitude of vibration of the internal combustion engine, calculates a first value based on a difference between a magnitude on the detected waveform and a magnitude on a waveform model determined in advance as a reference waveform of vibration of the internal combustion engine, in a second interval of crank angle, calculates a second value such that the second value is smaller as the number of revolutions of an output shaft of the internal combustion engine is smaller, calculates a third value based on the first value and the second value, and determines whether or not knocking has occurred in the internal combustion engine, based on the third value.

With the above-described configuration, the crank angle of the internal combustion engine is detected. The magnitude, of vibration of the internal combustion engine is detected in association with the crank angle. Based on the magnitude, the waveform of vibration in the first interval of crank angle is detected. The first value is calculated based on a difference between a magnitude on the detected waveform and a magnitude on a waveform model determined in advance as a reference waveform of vibration of the internal combustion engine, in the second interval of crank angle. Accordingly, the first value can be obtained that varies depending on the difference between respective magnitudes on the detected waveform and the waveform model. Further, the second value is calculated such that the second value is smaller as the number of revolutions of the output shaft of the internal combustion engine is smaller. Based on the first value and the second value, the third value is calculated. Accordingly, in the case where the number of revolutions of the output shaft of the internal combustion engine is relatively small, the influence of the second value can be made small as compared with the case where the number of revolutions thereof is relatively large. Therefore, in the case where the number of revolutions of the output shaft of the internal combustion engine is relatively small, the influence of the first value can be made relatively large as compared with the case where the number of revolutions thereof is relatively large. As a result, even if the difference between respective magnitudes on the detected waveform and the waveform model is small, the difference between respective magnitudes on the detected waveform and the waveform model can be reflected to a great degree on the third value. Based on the third value, whether or not knocking has occurred in the internal combustion engine is determined. Thus, in the case where the difference between respective magnitudes on the detected waveform and the waveform model is small despite the fact that knocking has not occurred, it can be determined correctly that knocking has not occurred. In contrast, in the case where the number of revolutions of the output shaft of the internal combustion engine is large, the influence of the second value can be made large as compared with the case where the number, of revolutions thereof is small. Thus, in the case where the number of revolutions of the output shaft of the internal combustion engine is large, the influence of the difference between respective magnitudes on the detected waveform and the waveform model can be restricted. As a result, whether or not knocking has occurred can be determined precisely.

Preferably, the operation unit sets the second interval such that the second interval is smaller as the number of revolutions of the output shaft of the internal combustion engine is smaller.

With the above-described configuration, the second interval is set such that the second interval is smaller as the number of revolutions of the output shaft of the internal combustion engine is smaller, since the range of crank angle in which vibration due to knocking is detected is smaller in the case where the number of revolutions of the output shaft is smaller, than that in the case where the number of revolutions thereof is larger. Accordingly, from crank angles at which the difference between the detected waveform and the waveform model is used, any crank angle at which vibration due to knocking is unlikely to occur can be removed. Thus, whether or not knocking has occurred can be determined precisely.

More preferably, the operation unit calculates the first value by summing differences that are each a difference between the magnitude on the detected waveform and the magnitude on the waveform model, in the second interval. In a case where the number of revolutions of the output shaft of the internal combustion engine is a first number of revolutions, the operation unit calculates the second value by summing values each determined by subtracting a positive reference value from the magnitude on the waveform model, in the second interval and, in a case where the number of revolutions of the output shaft of the internal combustion engine is a second number of revolutions larger than the first number of revolutions, the operation unit calculates the second value by summing magnitudes on the waveform model in the second interval. The operation unit calculates the third value by dividing the first value by the second value. In a case where the third value is smaller than a predetermined value, the operation unit determines that knocking has occurred in the internal combustion engine.

With the above-described configuration, the first value is calculated by summing respective differences between respective magnitudes on the detected waveform and respective magnitudes on the waveform model, in the second interval. In the case where the number of revolutions of the output shaft of the internal combustion engine is the first number of revolutions, the second value is calculated by summing values each determined by subtracting a positive reference value from the magnitude on the waveform model, in the second interval. In the case where the number of revolutions of the output shaft of the internal combustion engine is the second number of revolutions larger than the first number of revolutions, the second value is calculated by summing magnitudes on the waveform model in the second interval. The third value is calculated by dividing the first value by the second value. In the case where the third value is smaller than a predetermined value, it is determined that knocking has occurred in the internal combustion engine. Accordingly, knocking has occurred or not can be determined using a relative relation between the difference between respective magnitudes on the detected waveform and the waveform model and the magnitude on the waveform model. Therefore, even in the case where the difference between respective magnitudes on the detected waveform and the waveform model is small, it can be determined correctly that knocking has not occurred if it is considered from the magnitude of the waveform model that knocking is unlikely to occur.

More preferably, the operation unit detects a minimum value of magnitude on the detected waveform, and sets the reference value to the minimum value of magnitude on the detected waveform.

With the above-described configuration, the reference value is set to the minimum value of magnitude on the detected waveform. Accordingly, from the waveform model, the portion smaller than the minimum value can be removed. Therefore, the influence of the magnitude of the waveform model can be reduced.

More preferably, the operation unit detects respective minimum values of magnitude in a plurality of ignition cycles, the minimum values are each a minimum value of magnitude on the detected waveform, and sets the reference value to a value determined by adding a product of a standard deviation of the minimum values and a coefficient to a median of the minimum values.

With the above-described configuration, the reference value is set to the value determined by adding the product of the standard deviation of minimum values and a coefficient to the median of minimum values. From the waveform model, the portion smaller than the value determined by adding the product of the standard deviation of minimum values and a coefficient to the median of minimum values can be removed. Thus, the influence of the magnitude of the waveform model can be reduced.

More preferably, the operation unit limits the reference value to not more than a predetermined value.

With the above-described configuration, the reference value is restricted to not more than a predetermined value. Accordingly, the reference value can be prevented from becoming excessively large.

More preferably, the operation unit calculates an average of a minimum value of magnitude on the detected waveform and a magnitude at a crank angle adjacent to a crank angle at which the minimum value of magnitude is present on the detected waveform, and sets the reference value to the average.

With the above-described configuration, the reference value is set to the average of the minimum value of magnitude on the detected waveform and the magnitude at a crank angle adjacent to the crank angle at which the minimum value of magnitude is present on the detected waveform. Accordingly, from the waveform model, the portion smaller than the average can be removed. Thus, the influence of the magnitude of the waveform model can be reduced.

More preferably, the operation unit calculates respective averages in a plurality of ignition cycles, the averages are each an average of a minimum value of magnitude on the detected waveform and a magnitude at a crank angle adjacent to a crank angle at which the minimum value of magnitude is present on the detected waveform, and sets the reference value to a value determined by adding a product of a standard deviation of the averages and a coefficient to a median of the averages.

With the above-described configuration, the reference value is set to the value determined by adding the product of the standard deviation of averages and a coefficient to the median of averages. Accordingly, from the waveform model, the portion smaller than the value determined by adding the product of the standard deviation of averages and a coefficient to the median of averages can be removed. Thus, the influence of the magnitude of the waveform model can be reduced.

More preferably, the reference value is a constant value.

With the above-described configuration, from the waveform model, the portion smaller than the constant value can be removed. Thus, the influence of the magnitude of the waveform model can be reduced.

BRIEF DESCRIPTION OF THE DRAWINGS

FIG. 1 is a schematic configuration diagram showing an engine controlled by an engine ECU that is a knocking determination device according to a first embodiment of the present invention.

FIG. 11 is a functional block diagram of the engine ECU that is the knocking determination device according to the first embodiment of the present invention.

BEST MODES FOR CARRYING OUT THE INVENTION

Figure 2:
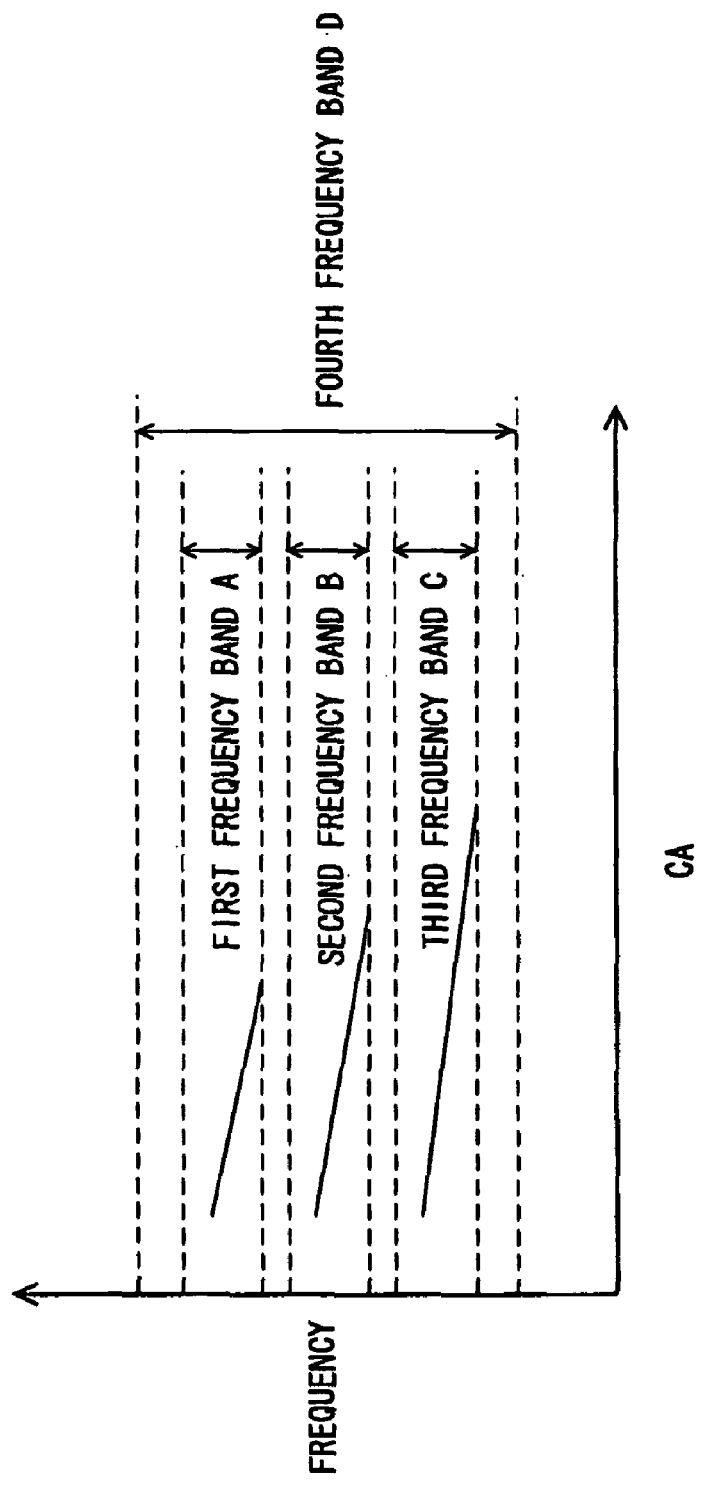
FIG. 2 shows frequency bands of vibration generated in the engine when knocking occurs.

In the following, embodiments of the present invention will be described with reference to the drawings. In the following description, like components are denoted by like reference characters. They are named and function identically as well. Therefore, a detailed description thereof will not be repeated.

First Embodiment

Referring to FIG. 1, an engine 100 of a vehicle equipped with a knocking determination device according to an embodiment of the present invention will be described. Engine 100 is provided with a plurality of cylinders. The knocking determination device in the present embodiment is implemented by a program executed by an engine ECU (Electronic Control Unit) 200 for example. The program executed by engine ECU 200 may be recorded on such a recording medium as CD (Compact Disc) or DVD (Digital Versatile Disc) to be distributed on the market.

Engine 100 is an internal combustion engine in which an air-fuel mixture of air drawn in from an air cleaner 102 and fuel injected from an injector 104 is ignited by a spark plug 106 and burnt in a combustion chamber. While the ignition timing is controlled to be MBT (Minimum advance for Best Torque) at which the output torque is maximum, the ignition timing is retarded or advanced according to an operation state of engine 100, for example, when knocking occurs.

When the air-fuel mixture is burnt, a piston 108 is pushed down by the combustion pressure and a crankshaft 110 is rotated. The air-fuel mixture after combustion (exhaust gas) is cleaned by three-way catalysts 112 and thereafter exhausted to the outside of the vehicle. The quantity of air drawn into engine 100 is regulated by a throttle valve 114.

Engine 100 is controlled by engine ECU 200. Connected to engine ECU 200 are a knock sensor 300, a water temperature sensor 302, a crank position sensor 306 provided to face a timing rotor 304, a throttle opening position sensor 308, a vehicle speed sensor 310, an ignition switch 312, and an air flow meter 314.

Knock sensor 300 is provided to a cylinder block of engine 100. Knock sensor 300 is formed of a piezoelectric element. Knock sensor 300 generates a voltage in response to vibration of engine 100. The magnitude of the voltage corresponds to the magnitude of the vibration. Knock sensor 300 sends a signal representing the voltage to engine ECU 200. Water temperature sensor 302 detects the temperature of a coolant in a water jacket of engine 100 and sends a signal representing the detection result to engine ECU 200.

Timing rotor 304 is provided to crankshaft 110 and rotates together with crankshaft 110. On the outer periphery of timing rotor 304, a plurality of protrusions are provided at predetermined intervals. Crank position sensor 306 is provided to face the protrusions of timing rotor 304. When timing rotor 304 rotates, an air gap between the protrusion of timing rotor 304 and crank position sensor 306 changes and, as a result, the magnetic flux passing through a coil portion of crank position sensor 306 increases/decreases to generate an electromotive force in the coil portion. Crank position sensor 306 sends a signal representing the electromotive force to engine ECU 200. Engine ECU 200 detects the crank angle and the number of revolutions of crankshaft 110 based on the signal sent from crank position sensor 306.

Throttle opening position sensor 308 detects a throttle opening position and sends a signal representing the detection result to engine ECU 200. Vehicle speed sensor 310 detects the number of revolutions of a wheel (not shown) and sends a signal representing the detection result to engine ECU 200. Engine ECU 200 calculates the vehicle speed based on the number of revolutions of the wheel. Ignition switch 312 is turned on by a driver when engine 100 is to be started. Air flow meter 314 detects the quantity of intake air into engine 100 and sends a signal representing the detection result to engine ECU 200.

Engine ECU 200 is operated by electric power supplied from an auxiliary battery 320 that is a power supply. Engine ECU 200 performs operation processes based on signals sent from respective sensors and ignition switch 312 as well as a map and a program stored in a ROM (Read-Only Memory) 202, and controls relevant devices so as to allow engine 100 to operate in a desired state.

In the present embodiment, engine ECU 200 detects a waveform of vibration (hereafter referred to as "vibration waveform") of engine 100 in a predetermined knock detection gate (a section from a predetermined first crank angle to a predetermined second crank angle), based on the signal sent from knock sensor 300 and the crank angle, and determines whether or not knocking has occurred in engine 100, based on the detected vibration waveform. The knock detection gate in the present embodiment is the section from the top dead center (0°) to 90° in a combustion stroke. The knock detection gate is not limited to this.

When knocking occurs, vibration at a frequency near the frequency shown as the solid line in FIG. 2 is generated in engine 100. The frequency of vibration caused by the knocking is not constant but has a certain frequency band.

If the vibration is detected in a relatively broad frequency band, it is more likely that noise (for example, vibration caused by an in-cylinder injector or intake/exhaust valve sitting on its seat) other than the vibration caused by knocking is included.

On the contrary, if the vibration is detected in a relatively narrow frequency band, a noise component included in the magnitude of the detected vibration can be suppressed while a characteristic portion (such as the timing of occurrence of vibration and damping rate thereof) of the noise component is also removed from the vibration waveform. In this case, even if the vibration is actually due to the noise component, a vibration waveform including no noise component, namely the vibration waveform similar to the vibration waveform detected when knocking occurs is detected. Therefore, in this case, it is difficult to distinguish vibration due to knocking from vibration due to noise, based on the vibration waveform.

Accordingly, in the present embodiment, vibration is detected in a first frequency band A, a second frequency band B and a third frequency band C that are set to have a smaller bandwidth, in order to precisely capture vibration specific to knocking.

On the other hand, in order to determine whether or not knocking has occurred in consideration of noise when the noise has occurred, the vibration is detected in a broader fourth frequency band D including the first to third frequency bands A to C so as to capture the noise.

Figure 3:
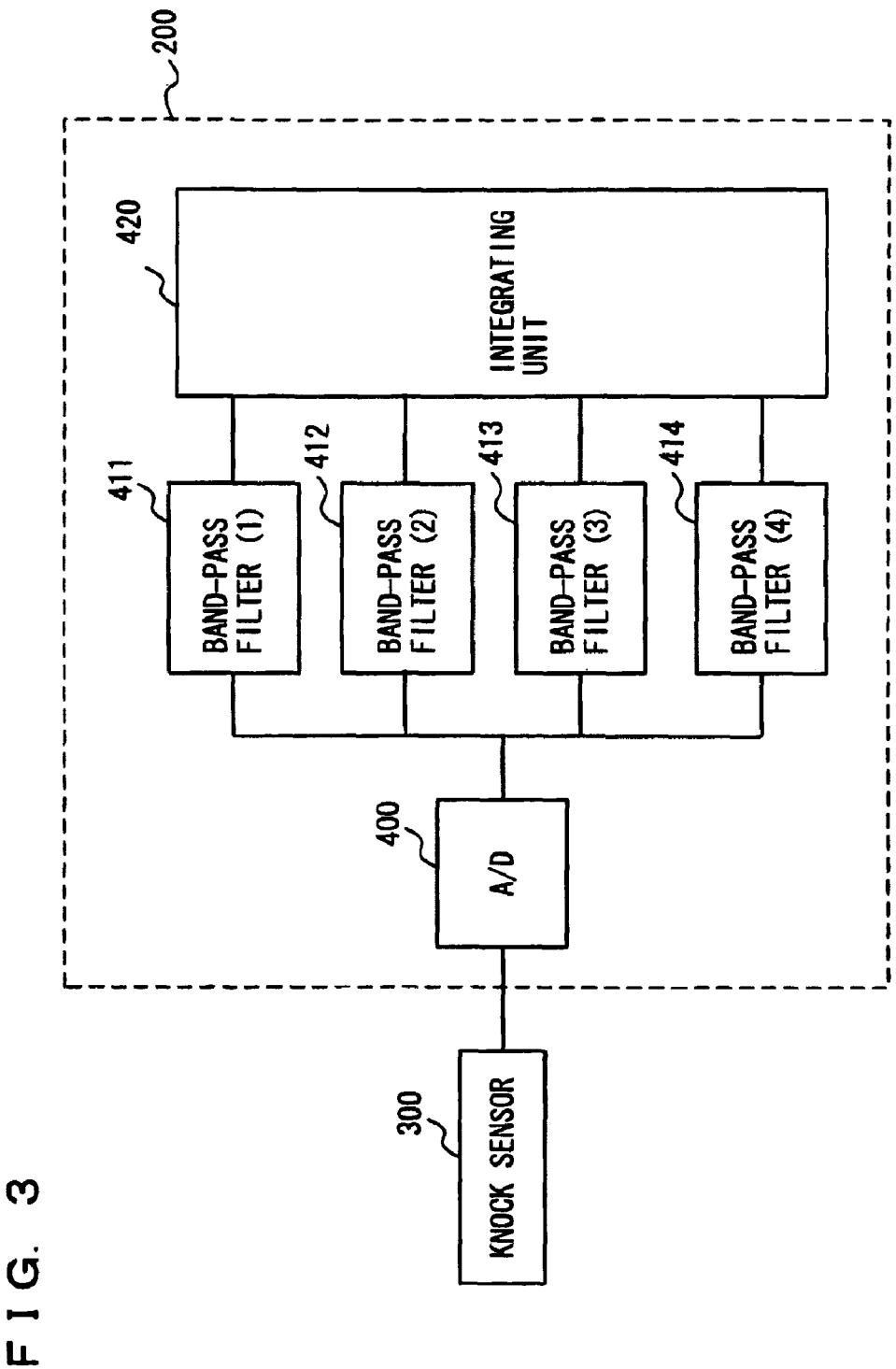
FIG. 3 is a control block diagram showing the engine ECU.

As shown in FIG. 3, engine ECU 200 includes an A/D (analog/digital) converter 400, a band-pass filter (1) 411, a band-pass filter (2) 412, a band-pass filter (3) 413, a band-pass filter (4) 414, and an integrating unit 420.

Band-pass filter (1) 411 passes only the signal in first frequency band A out of the signals transmitted from knock sensor 300. In other words, band-pass filter (1) 411 extracts only the vibration in first frequency band A out of the vibrations detected by knock sensor 300.

Band-pass filter (2) 412 passes only the signal in second frequency band B out of the signals transmitted from knock sensor 300. In other words, band-pass filter (2) 412 extracts only the vibration in second frequency band B out of the vibrations detected by knock sensor 300.

Band-pass filter (3) 413 passes only the signal in third frequency band C out of the signals transmitted from knock sensor 300. In other words, band-pass filter (3) 413 extracts only the vibration in third frequency band C out of the vibrations detected by knock sensor 300.

Band-pass filter (4) 414 passes only the signal in fourth frequency band D out of the signals transmitted from knock sensor 300. In other words, band-pass filter (4) 414 extracts only the vibration in fourth frequency band D out of the vibrations detected by knock sensor 300.

Integrating unit 420 calculates an integrated value by integrating the signals selected by band-pass filter (1) 411 to band-pass filter (4) 414, namely integrating the magnitudes of vibration for every crank angle range of 5° (hereinafter also referred to as 5° integrated value). The 5° integrated value is calculated for each frequency band.

Further, respective integrated values calculated for first to third frequency bands A to C are added together in association with the crank angle. In other words, respective vibration waveforms of first to third frequency bands A to C are combined into a synthesized waveform.

Figure 4:
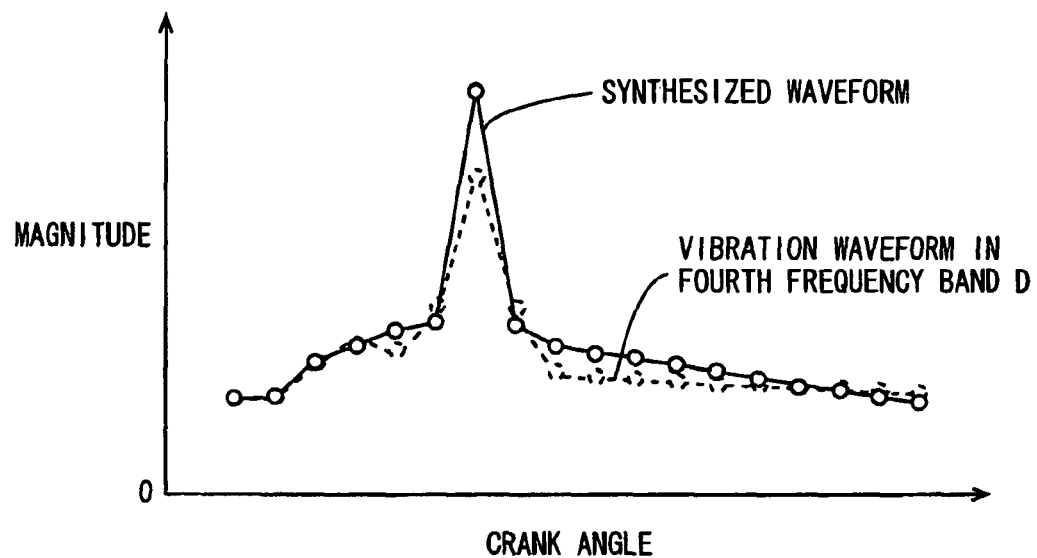
FIG. 4 is a (first) chart showing a vibration waveform of the engine.

Thus, in the present embodiment as shown in FIG. 4, the synthesized waveform formed of first to third frequency bands A to C and the vibration waveform of fourth frequency band D are used as vibration waveforms of engine 100. The vibration waveform (5° integrated value) of fourth frequency band D is not combined but used singly.

Figure 5:
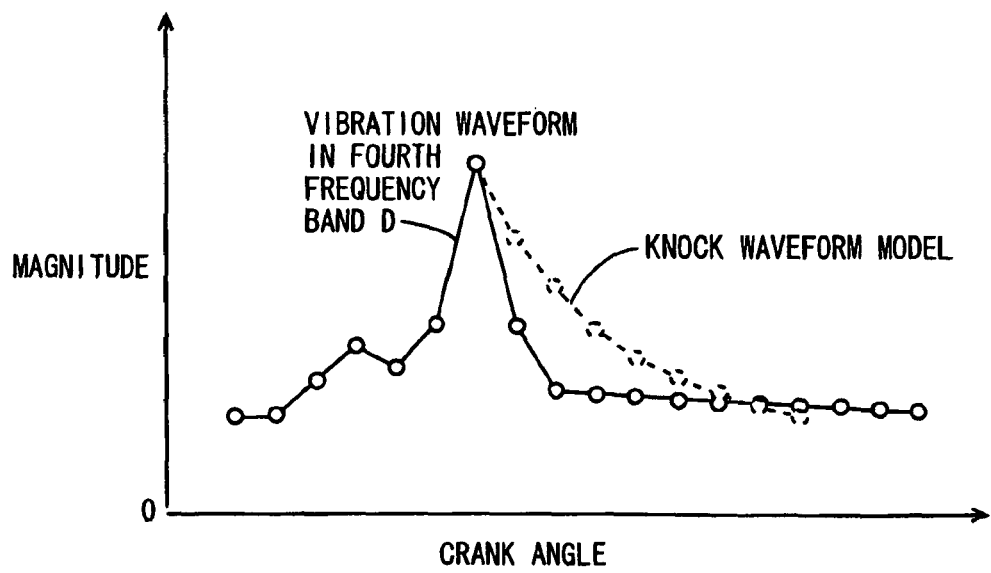
FIG. 5 is a (first) chart showing the vibration waveform and a knock waveform model as compared with each other.

Of the detected vibration waveforms, the vibration waveform in fourth frequency band D is compared with a knock waveform model, in the range of crank angle from the crank angle at which the magnitude is maximum, as shown in FIG. 5. The knock waveform model is defined as a reference vibration waveform of engine 100. In the present embodiment, the magnitude of the knock waveform model is set each time the vibration waveform in fourth frequency band D is detected. Namely, the magnitude of the knock waveform model is determined for every ignition cycle.

The magnitude of the knock waveform model is set based on the magnitude of the vibration waveform in fourth frequency band D (5° integrated value). More specifically, the magnitude is set so that the maximum magnitude on the knock waveform model is identical to the maximum magnitude on the vibration waveform in fourth frequency band D.

The magnitudes other than the maximum magnitude are set according to engine speed NE and the load of engine 100. More specifically, the damping rate of the magnitude at a crank angle relative to the magnitude at the adjacent crank angle is set according to a map using engine speed NE and the load of engine 100 as parameters.

Figure 6:
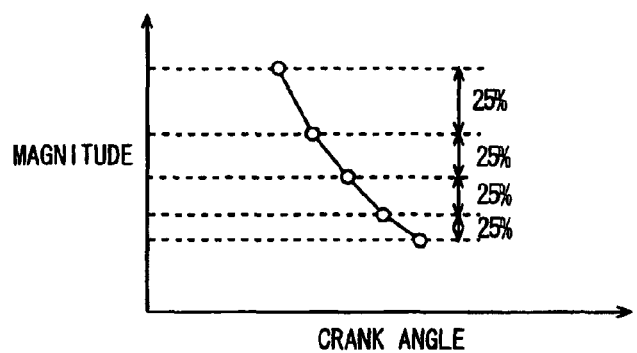
FIG. 6 is a chart showing the knock waveform model.

Therefore, in the case for example where the damping rate is 25% and the magnitudes in a range of crank angle of 20° are set, the magnitude decreases 25% per unit crank angle as shown in FIG. 6. Here, the method of setting the magnitude on the knock waveform model is not limited to the above-described one.

Figure 7:
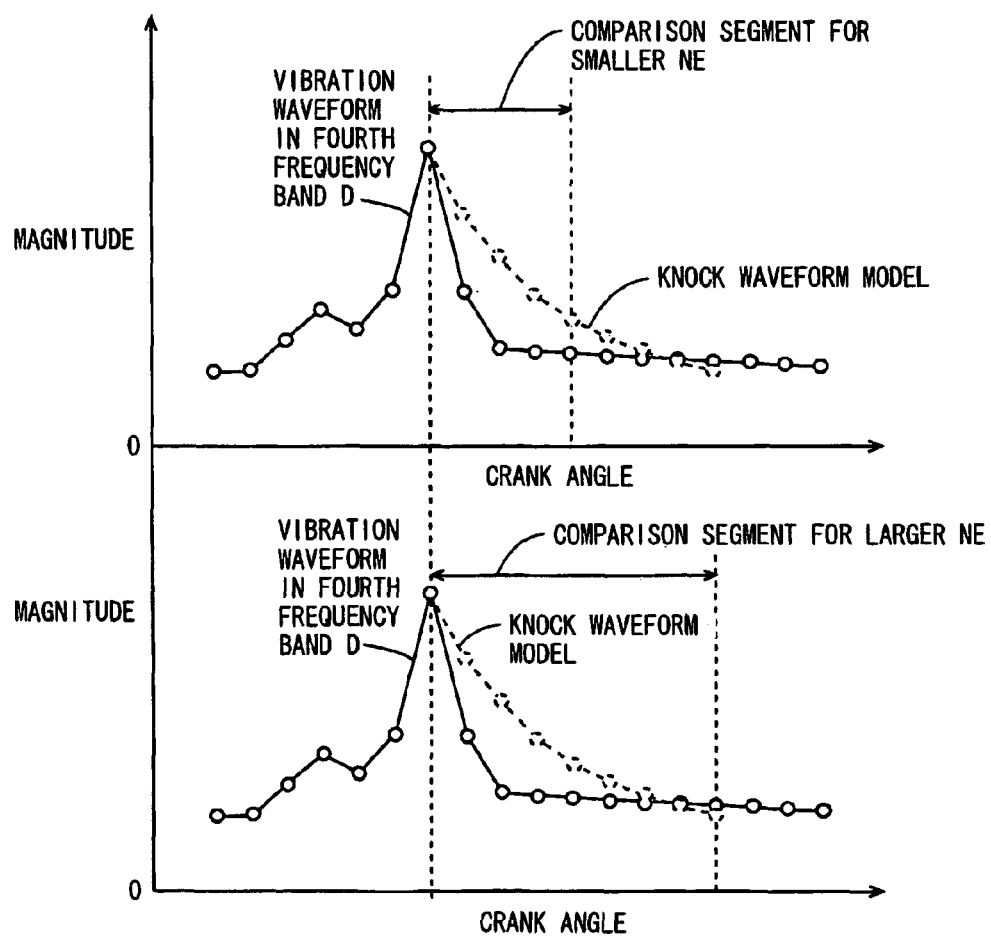
FIG. 7 is a (first) chart showing a comparison segment where the vibration waveform and the knock waveform model are compared with each other.

The vibration waveform and the knock waveform model are compared with each other in a comparison segment. The comparison segment is set according to engine speed NE. As shown in FIG. 7, the comparison segment is set so that the comparison segment is smaller as engine speed NE is smaller. The comparison segment may be set according to the load of engine 100.

In the present embodiment, engine ECU 200 calculates a correlation coefficient K that represents the degree of similarity of the vibration waveform to the knock waveform model (represents a deviation between the vibration waveform and the knock waveform model). The timing at which the magnitude of vibration is maximum on the vibration waveform is made coincident with the timing at which the magnitude of vibration is maximum on the knock waveform model, and then the absolute value of the difference (amount of deviation) between the magnitude on the vibration waveform and the magnitude on the knock waveform model is calculated for every crank angle (every 5°) to thereby calculate correlation coefficient K. The absolute value of the difference between the magnitude on the vibration waveform and the magnitude on the knock waveform model for every crank angle other than 5° may be calculated instead.

It is supposed here that the absolute value of the difference between the magnitude on the vibration waveform and the magnitude on the knock waveform model for each crank angle is $\Delta S$ (I) (I is a natural number). As shown by the oblique lines in FIG. 8, it is supposed that the sum of the magnitudes on the knock waveform model in the comparison segment, namely the area of the knock waveform model in the comparison segment, is S. Correlation coefficient K is calculated using equation (1) below:

$$K=(S-\Sigma\Delta S(I))/S \qquad (1)$$

where $\Sigma\Delta S$ (I) is the total of $\Delta S$ (I) in the comparison segment.

Figure 8:
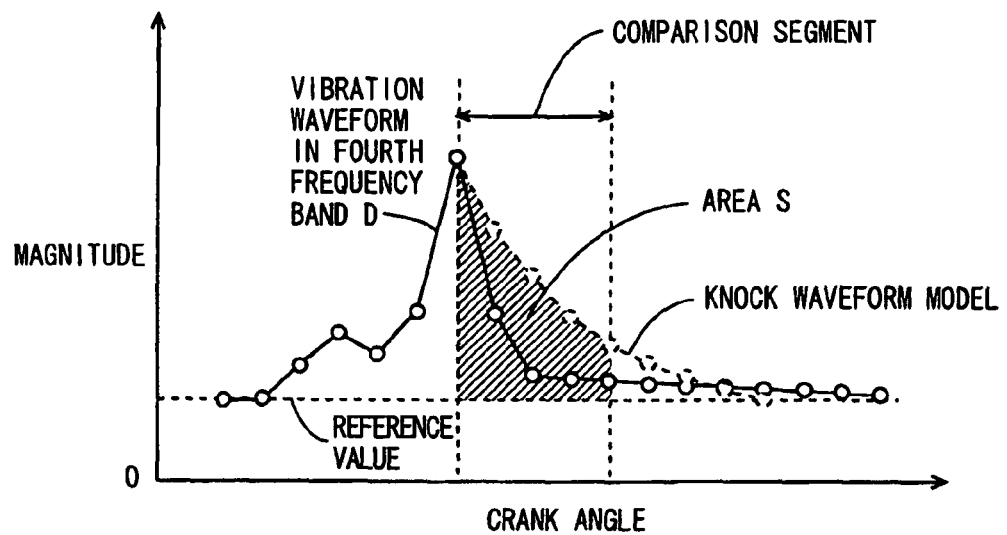
FIG. 8 is a (first) chart showing an area S used for calculating a correlation coefficient K.
Figure 9:
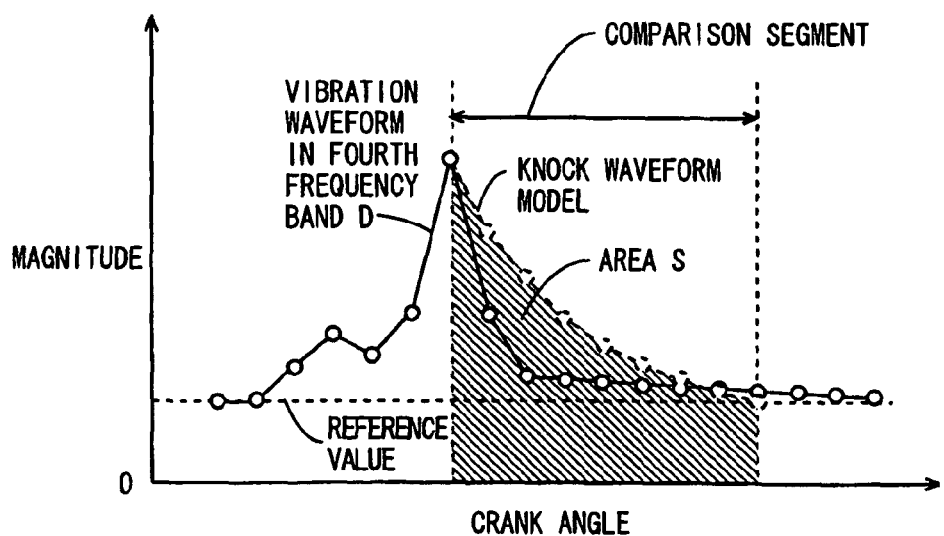
FIG. 9 is a (second) chart showing an area S used for calculating a correlation coefficient K.

In the present embodiment, in the case where engine speed NE is smaller than threshold value NE (1), the sum of values each determined by subtracting a positive reference value from the magnitude on the knock waveform model in the comparison segment, as indicated by the oblique lines in FIG. 8, is used as area S of the knock waveform model. Namely, in the comparison segment, the area occupied by the magnitudes of not less than the reference value is used as area S of the knock waveform model. In contrast, in the case where engine speed NE is not less than threshold value NE (1), correlation coefficient K is calculated using the whole of area S of the knock waveform model in the comparison segment, as indicated by the oblique lines in FIG. 9. As the reference value, the minimum magnitude on the vibration waveform in fourth frequency band D is used for example. The method of calculating correlation coefficient K is not limited to the above-described one.

Figure 10:
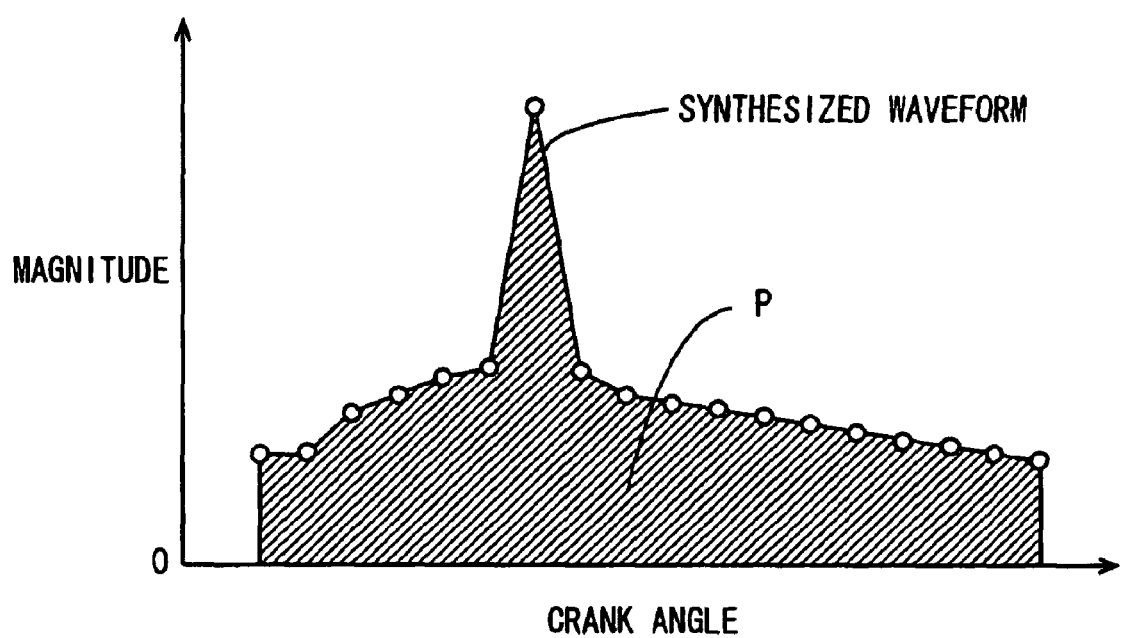
FIG. 10 is a chart showing the sum of magnitudes of a synthesized waveform used for calculating a knock magnitude N.

Further, engine ECU 200 calculates knock magnitude N using the sum of the 5° integrated values of the synthesized waveform of first to third frequency bands A to C, as indicated by the oblique lines in FIG. 10.

It is supposed that the sum of the 5° integrated values of the synthesized waveform is P, and a value representing the magnitude of vibration of engine 100 in the state where vibration does not occur in engine 100 is BGL (Back Ground Level). Then, knock magnitude N is calculated using the equation N=P/BGL. BGL is determined in advance based on simulation or experiment for example and stored in ROM 202. The method of calculating knock magnitude N is not limited to the above-described one.

In the present embodiment, engine ECU 200 compares the calculated knock magnitude N with threshold value V (J) stored in ROM 202 and further compares correlation coefficient K with threshold value K (0) stored in ROM 202 to determine, for every ignition cycle, whether or not knocking has occurred in engine 100.

Referring to FIG. 11, a description will be given of the functions of engine ECU 200 which is the knocking determination device in the present embodiment. The functions described below may be implemented by software or implemented by hardware.

Engine ECU 200 includes a crank angle detection unit 210, a magnitude detection unit 220, a waveform detection unit 230, a segment setting unit 240, a minimum value detection unit 250, a reference value setting unit 260, a correlation coefficient calculation unit 270, a knock magnitude calculation unit 280, and a knocking determination unit 290.

Crank angle detection unit 210 detects the crank angle based on a signal sent from crank position sensor 306.

Magnitude detection unit 220 detects the magnitude of vibration in the knock detection gate based on a signal sent from knock sensor 300. The magnitude of vibration is detected in association with a crank angle. Further, the magnitude of vibration is represented by an output voltage value of knock sensor 300. The magnitude of vibration may be represented by a value corresponding to the output voltage value of knock sensor 300.

Waveform detection unit 230 detects the vibration waveform in the knock detection gate by integrating the magnitudes of vibration for every crank angle of 5°.

Segment setting unit 240 sets a comparison segment where the vibration waveform and the knock waveform model are compared with each other, so that the segment is smaller as engine speed NE is smaller.

Minimum value detection unit 250 detects the minimum value of magnitude on the vibration waveform in fourth frequency band D. Reference value setting unit 260 sets the reference value to the minimum value of magnitude on the vibration waveform in fourth frequency band D. The detection of the minimum value and the setting of the reference value are performed for every ignition cycle. Namely, in a plurality of ignition cycles each, the minimum value is detected and the reference value is set.

Correlation coefficient calculation unit 270 calculates correlation coefficient K. Knock magnitude calculation unit 280 calculates knock magnitude N. Knocking determination unit 290 determines that knocking has occurred in the case where knock magnitude N is larger than threshold value V (J) and correlation coefficient K is larger than threshold value K (0).

Equation (1) described above can be transformed to:

$$K = 1 - \Sigma \Delta S(I)/S \quad (2).$$

Equation (2) can be further transformed to:

$$\Sigma \Delta S(I)/S = 1 - K \quad (3).$$

Therefore, the fact that correlation coefficient K is larger than threshold value K (0) is identical to the fact that $\Sigma \Delta S$ (I)/S is smaller than 1−K (0).

Figure 12:
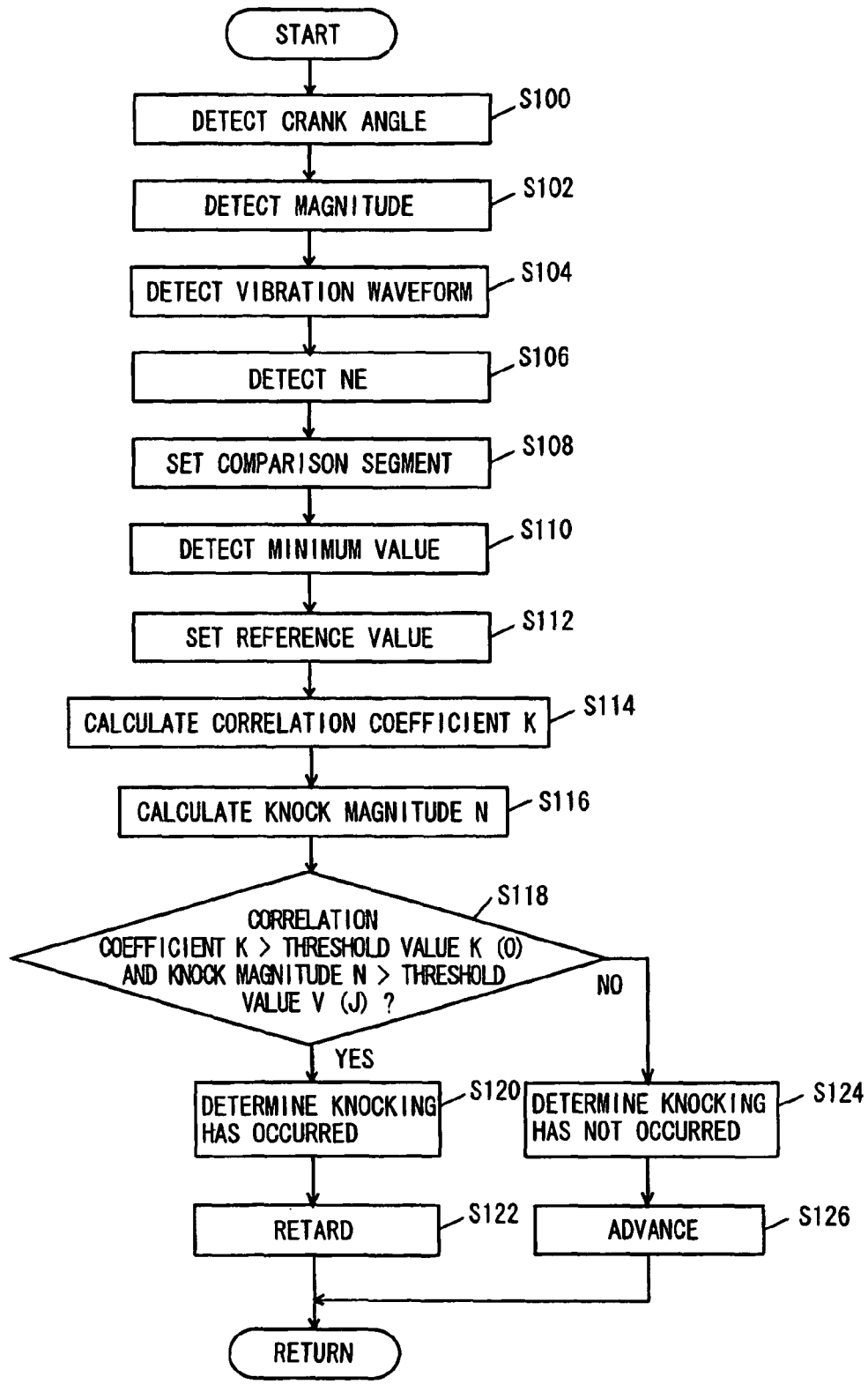
FIG. 12 is a flowchart showing a control structure of a program executed by the engine ECU that is the knocking determination device according to the first embodiment of the present invention.

Referring to FIG. 12, a description will be given of a control structure of a program executed by engine ECU 200 which is the knocking determination device in the present embodiment. The program described below is repeatedly executed in predetermined cycles (for every ignition cycle for example).

In step (hereinafter "step" will be abbreviated as "S") 100, engine. ECU 200 detects the crank angle based on a signal sent from crank position sensor 306.

In S102, engine ECU 200 detects the magnitude of vibration of engine 100 in association with the crank angle, based on a signal sent from knock sensor 300.

In S104, engine ECU 200 calculates the 5° integrated value by integrating output voltage values (each representing the magnitude of vibration) of knock sensor 300 for every crank angle of 5° (for) 5° to detect the vibration waveform of engine 100. Namely, the synthesized waveform in first to third frequency bands A to C and the vibration waveform in fourth frequency band D are detected.

In S106, engine ECU 200 detects engine speed NE based on a signal sent from crank position sensor 306. In S108, engine ECU 200 sets a comparison segment where the vibration waveform and the knock waveform model are compared with each other, so that the comparison segment is smaller as engine speed NE is smaller.

In S110, engine ECU 200 detects the minimum value of magnitude on the vibration waveform in fourth frequency band D. In S112, engine ECU 200 sets the reference value to the minimum value of magnitude on the vibration waveform in fourth frequency band D.

In S114, engine ECU 200 calculates correlation coefficient K. In S116, engine ECU 200 calculates knock magnitude N.

In S118, engine ECU 200 determines whether or not correlation coefficient K is larger than K (0) and knock magnitude N is larger than threshold value V (J). When correlation coefficient K is larger than threshold value K (0) and knock magnitude N is larger than V (J) (YES in S118), the process proceeds to S120. Otherwise (NO in S118), the process proceeds to S124.

In S120, engine ECU 200 determines that knocking has occurred. In S122, engine ECU 200 retards the ignition timing.

In S124, engine ECU 200 determines that knocking has not occurred. In S126, engine ECU 200 advances the ignition timing.

A description will be given of operation of engine ECU 200 which is the knocking determination device in the present embodiment, based on the above-described structure and flowchart.

While engine 100 is operating, the crank angle is detected based on a signal sent from crank position sensor 306 (S100). Based on the signal sent from knock sensor 300, the magnitude of vibration of engine 100 is detected in association with a crank angle (S102). The 5° integrated value is calculated to detect the vibration waveform of engine 100 (S104).

Further, based on the signal sent from crank position sensor 306, engine speed NE is detected (S106). The comparison segment for comparing the vibration waveform with the knock waveform model is set so that the segment is smaller as engine speed NE is smaller (S108). Further, the minimum value of magnitude on the vibration waveform in fourth frequency band D is detected (S110). The reference value is set to the minimum value of magnitude on the vibration waveform in fourth frequency band D (S112).

Figure 13:
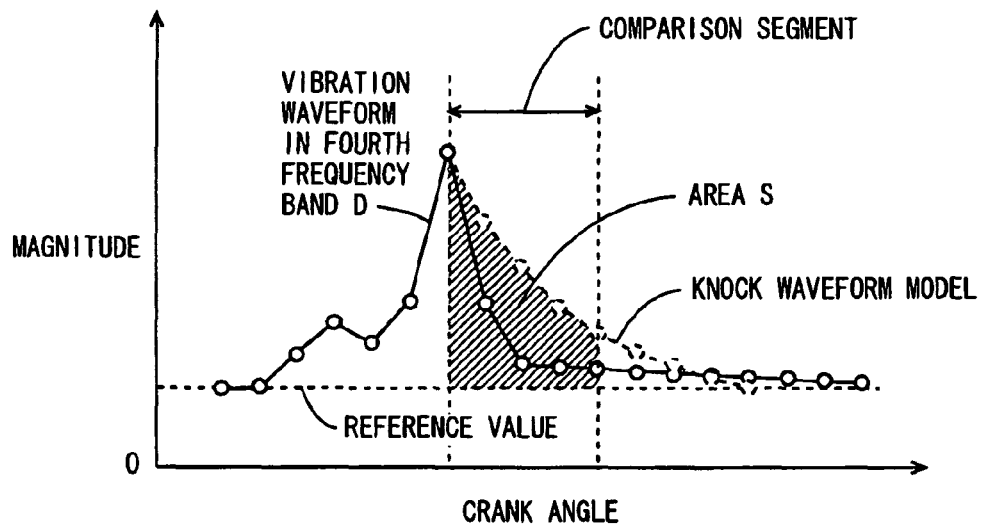
FIG. 13 is a (third) chart showing an area S used for calculating a correlation coefficient K.

As shown in FIG. 13, in the case where engine speed NE is smaller than threshold value NE (1), the sum of values each determined by subtracting a positive reference value from the magnitude on the knock waveform model is used as area S of the knock waveform model to calculate correlation coefficient K (S114).

Thus, the influence of the magnitude itself of the knock waveform model on correlation coefficient K can be reduced. Therefore, the influence of the difference between the magnitude on the vibration waveform and the magnitude on the knock waveform model on correlation coefficient K can be made relatively large.

Figure 14:
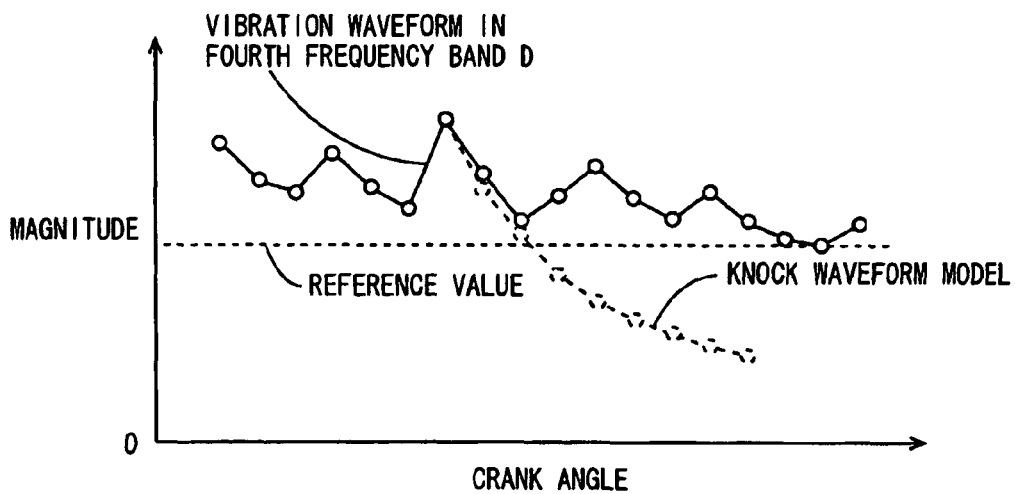
FIG. 14 is a (second) chart showing a vibration waveform and a knock waveform model as compared with each other.

However, as shown in FIG. 14, in the state where engine speed NE is large, the minimum value of magnitude on the vibration waveform in fourth frequency band D, namely the reference value, can be relatively large. Thus, if the sum of values each determined by subtracting the reference value from the magnitude on the knock waveform model is used as area S of the knock waveform model, area S can be smaller than required.

Figure 15:
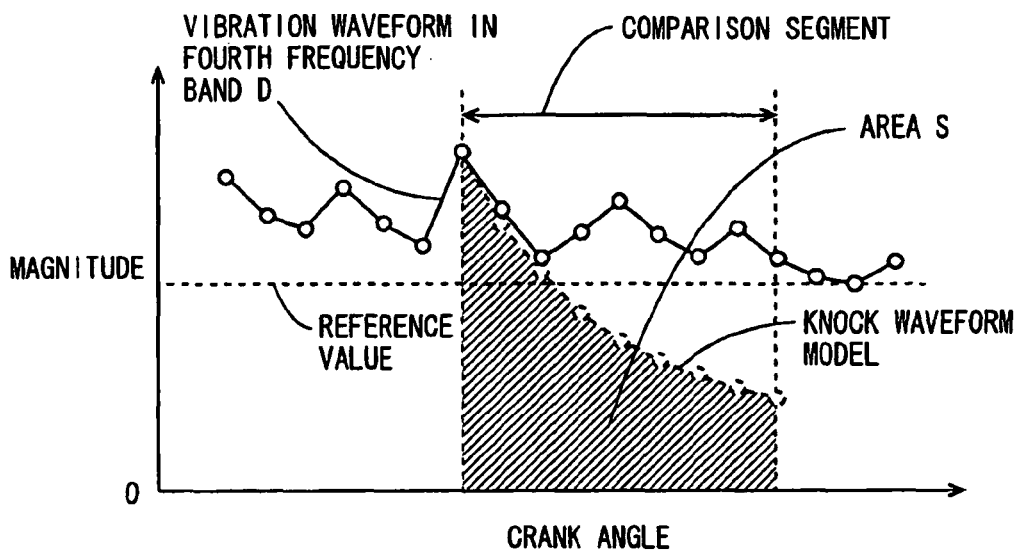
FIG. 15 is a (fourth) chart showing an area S used for calculating a correlation coefficient K.

Therefore, as shown in FIG. 15, in the case where engine speed NE is not less than threshold value NE (1), the whole area S of the knock waveform model in the comparison segment is used to calculate correlation coefficient K (S114). Thus, the influence of area S of the knock waveform model on correlation coefficient K can be increased. Accordingly, the influence of the difference between the magnitude on the vibration waveform and the magnitude on the knock waveform model on correlation coefficient K can be made relatively small. Consequently, the influence of the difference in magnitude can be restricted.

In the case where engine speed NE is small, the amount of change of the crank angle per second for example is smaller than that in the case where engine speed NE is large. In contrast, the length of time in which vibration occurs due to knocking is substantially constant regardless of engine speed NE.

Figure 16:
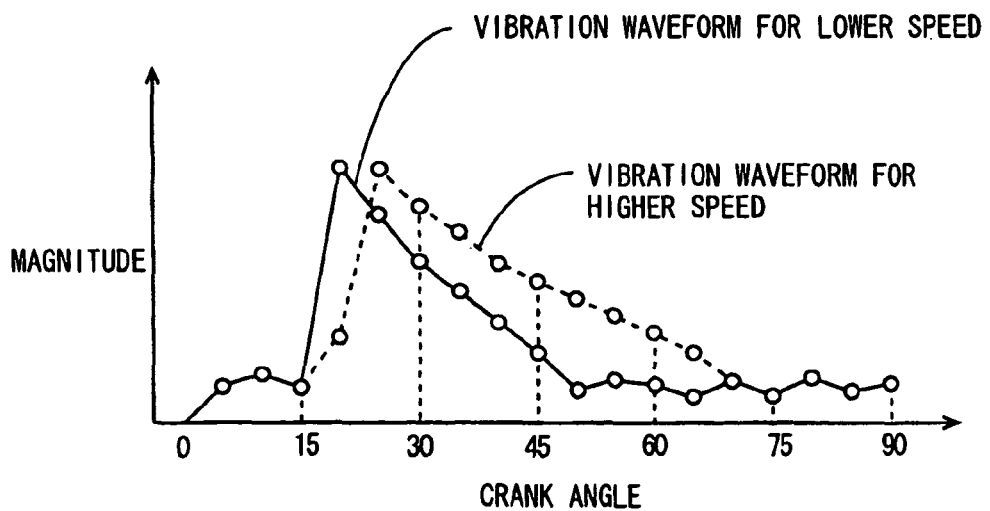
FIG. 16 is a (second) chart showing a vibration waveform of the engine.

Therefore, as shown in FIG. 16, the interval of crank angle in which vibration due to knocking is detected is shorter in the case where engine speed NE is small, than that in the case where engine speed NE is large. Accordingly, in the present embodiment, correlation coefficient K is calculated based on the value determined by adding up the differences between respective magnitudes on the vibration waveform and respective magnitudes on the knock waveform model in a comparison segment which is determined so that the comparison segment is smaller as engine speed NE is smaller. In this way, from the segment in which the difference between the vibration waveform and the knock waveform model is used, a segment where vibration due to knocking is unlikely to occur can be removed.

In addition to correlation coefficient K, the sum of magnitudes of the synthesized waveform of first to third frequency bands A to C is used to calculate knock magnitude N (S116).

When correlation coefficient K is larger than threshold value K (0) and knock magnitude N is larger than threshold value V (J) (YES in S118), it is determined that knocking has occurred (S120). In this case, the ignition timing is retarded (S122).

In contrast, when correlation coefficient K is not larger than threshold value K (0) or knock magnitude N is not larger than threshold value V (J) (NO in S118), it is determined that knocking has not occurred (S124). In this case, the ignition timing is advanced (S126).

As described above, when engine speed NE is smaller than threshold value NE (1), the engine ECU which is the knocking determination device in the present embodiment uses the sum of values each determined by subtracting a positive reference value from the magnitude on the knock waveform model, as area S of the knock waveform model, in order to calculate correlation coefficient K. Thus, the influence of the magnitude itself of the knock waveform model on correlation coefficient K can be reduced. Therefore, the influence of the difference between the magnitude on the vibration waveform and the magnitude on the knock waveform model on correlation coefficient K can be made relatively large. This correlation coefficient K is used to determine whether or not knocking has occurred. In this way, it can be determined correctly that knocking has not occurred, in the case where the difference between respective magnitudes on the vibration waveform and the waveform model is small regardless of the fact that knocking has not occurred. In contrast, in the case where engine speed NE is not less than threshold value NE (1), the whole of area S of the knock waveform model in the comparison segment is used to calculate correlation coefficient K. Thus, the influence of the difference between respective magnitudes on the vibration waveform and the knock waveform model on correlation coefficient K can be made relatively small. Accordingly, the influence of the difference between respective magnitudes on the vibration waveform and the knock waveform model on correlation coefficient K can be restricted. Consequently, it can be determined precisely whether or not knocking has occurred.

Second Embodiment

In the following, a second embodiment of the present invention will be described. The present embodiment differs from the above-described first embodiment in that the reference value is set based on a frequency distribution of the minimum values of vibration waveforms. Other features such as the configuration of engine 100 itself are identical to those in the first embodiment, and they function identically as well. Therefore, the detailed description thereof will not be repeated here.

Figure 17:
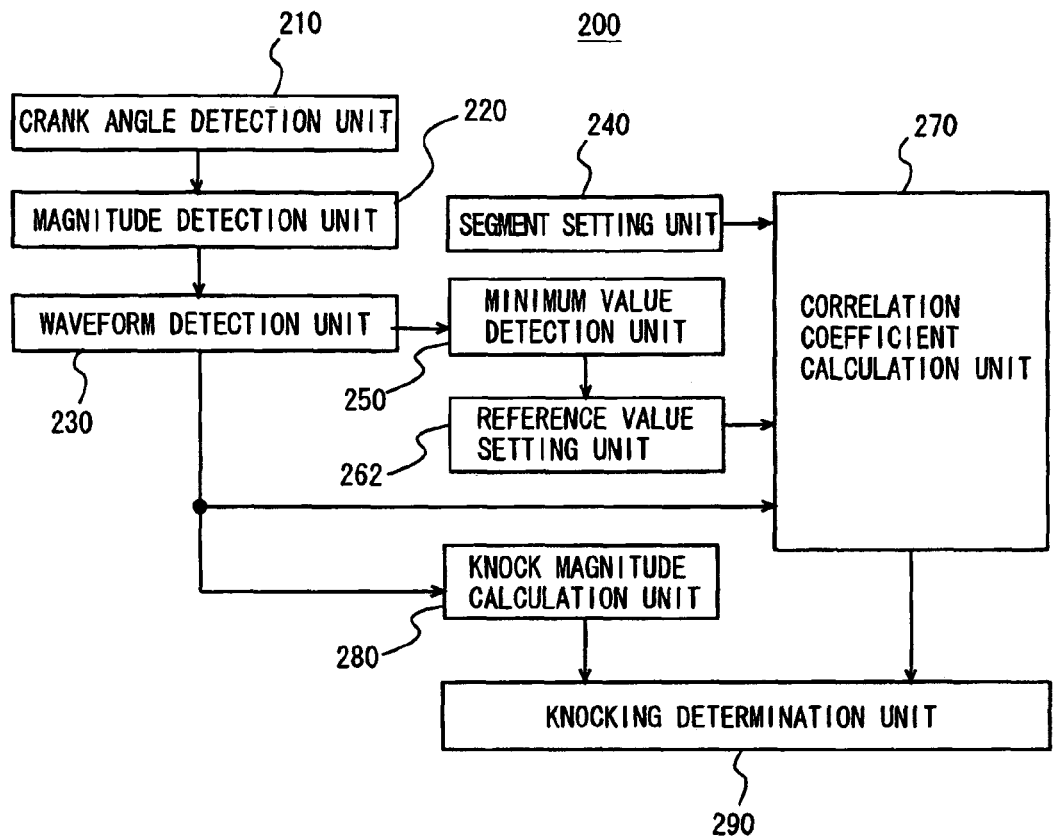
FIG. 17 is a functional block diagram of an engine ECU that is a knocking determination device according to a second embodiment of the present invention.

Referring to FIG. 17, a description will be given of the functions of engine ECU 200 that is a knocking determination device in the present embodiment. The functions described below may be implemented by software or implemented by hardware. The same functions of the present embodiment and the first embodiment are denoted by the same numeral. Therefore, the detailed description thereof will not be repeated here.

Figure 18:
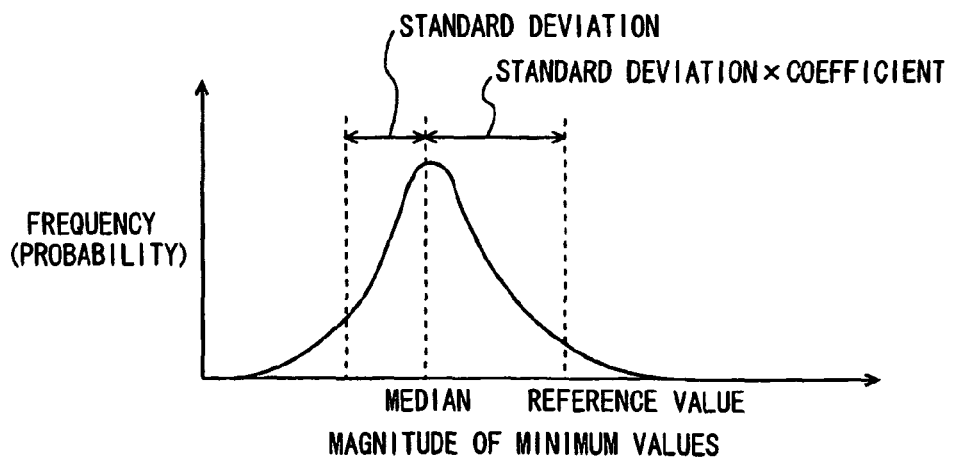
FIG. 18 is a chart showing a frequency distribution of minimum values of magnitude.

In the present embodiment, a reference value setting unit 262 sets the reference value based on the frequency distribution of the minimum values of magnitude on the vibration waveforms in fourth frequency band D. As shown in FIG. 18, the reference value is set to the value determined by adding the product of the standard deviation of the minimum values and a coefficient to the median of the minimum values. The coefficient is "2" for example. The minimum values used for setting the reference value are for example respective minimum values in 200 ignition cycles. When the reference value is set, the minimum values undergo a logarithmic transformation to be used. Therefore, the reference value that is set using the frequency distribution undergoes an inverse logarithmic transformation to be used.

Figure 19:
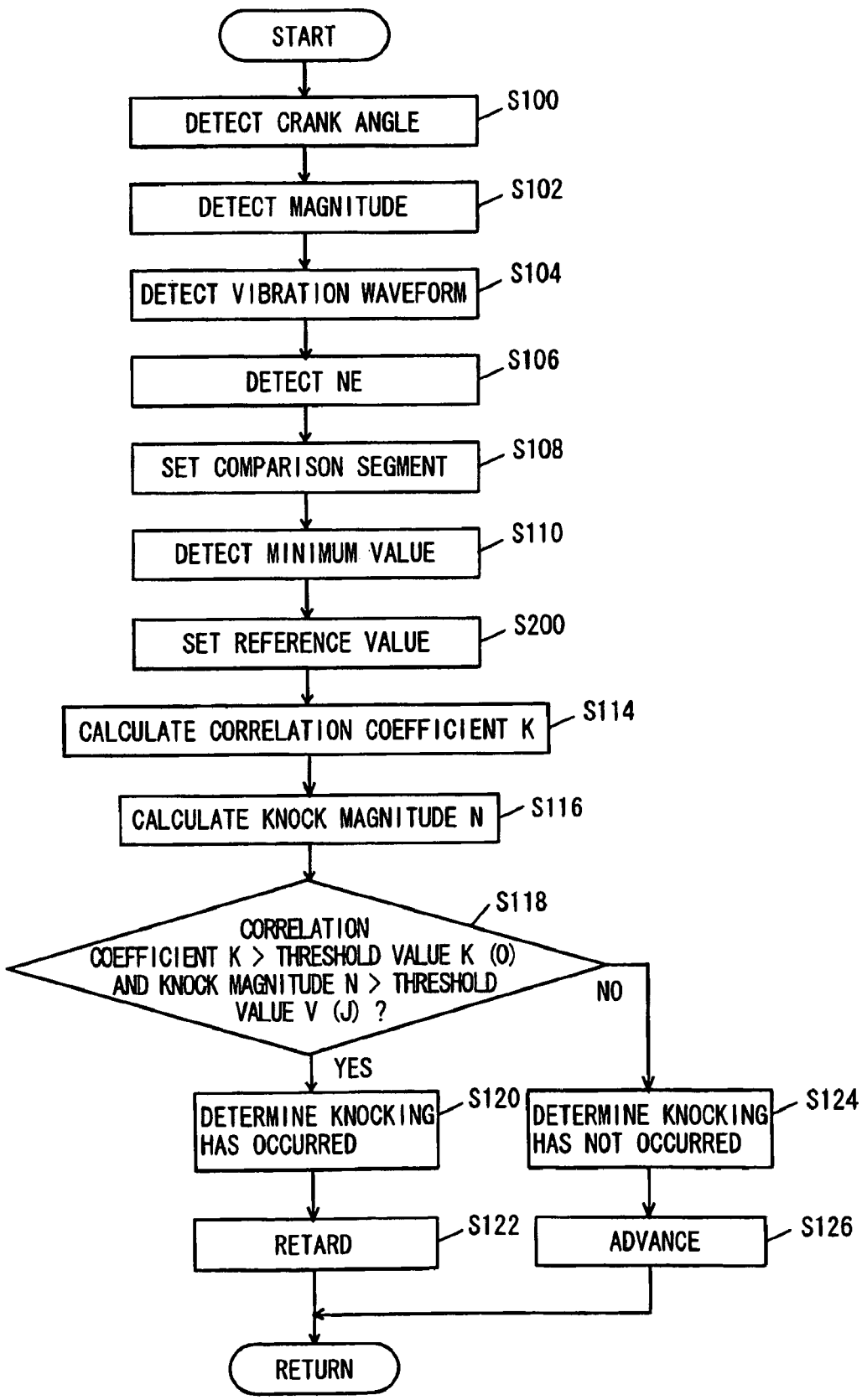
FIG. 19 is a flowchart showing a control structure of a program executed by the engine ECU that is the knocking determination device according to a second embodiment of the present invention.

Referring to FIG. 19, a description will be given of a control structure of a program executed by engine ECU 200 which is the knocking determination device in the present embodiment. The same process step as that of the first embodiment is denoted by the same step number. Therefore, the detailed description thereof will not be repeated here.

In S200, engine ECU 200 sets the reference value, to a value determined by adding the product of the standard deviation of the minimum values and a coefficient to the median of the minimum values. In this manner, the effects similar to those of the first embodiment can be achieved as well.

Third Embodiment

In the following, a third embodiment of the present invention will be described. The present embodiment differs from the above-described second embodiment in that the reference value is limited to a predetermined value or less. Other features such as the configuration of engine 100 itself are identical to those in the above-described first embodiment. They functions identically as well. Therefore, the detailed description thereof will not be repeated here.

Figure 20:
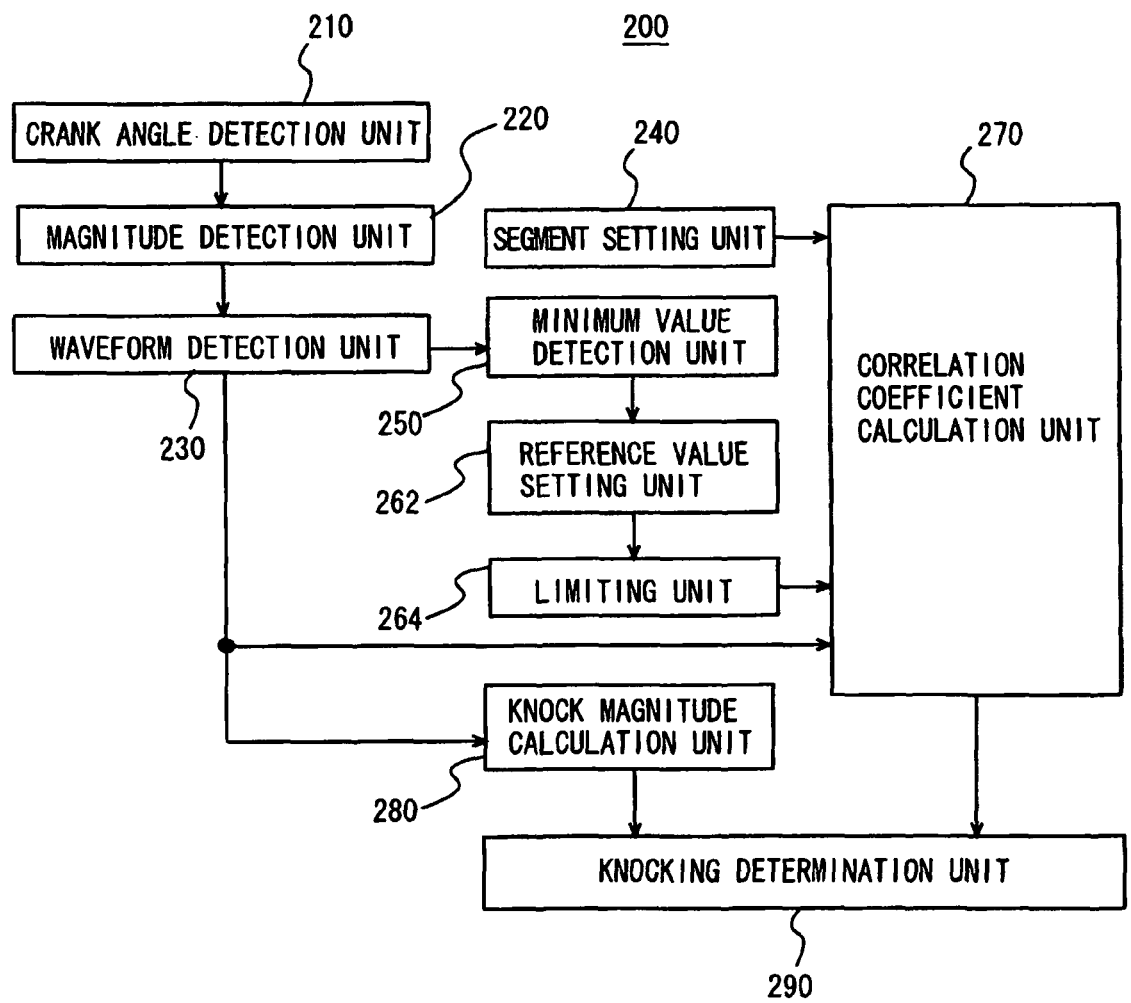
FIG. 20 is a functional block diagram of an engine ECU that is a knocking determination device according to a third embodiment of the present invention.

Referring to FIG. 20, a description will be given of the functions of engine ECU 200 that is a knocking determination device in the present embodiment. The functions described below may be implemented by software or implemented by hardware. The same functions of the present embodiment and the above-described first or second embodiment are denoted by the same numeral, and the detailed description thereof will not be repeated here.

Engine ECU 200 further includes a limiting unit 264. Limiting unit 264 limits the reference value to an upper limit or less. The upper limit is for example twice as large as the median of the minimum values. The upper limit is not restricted to this. Alternatively, the upper limit may set to a constant value.

Figure 21:
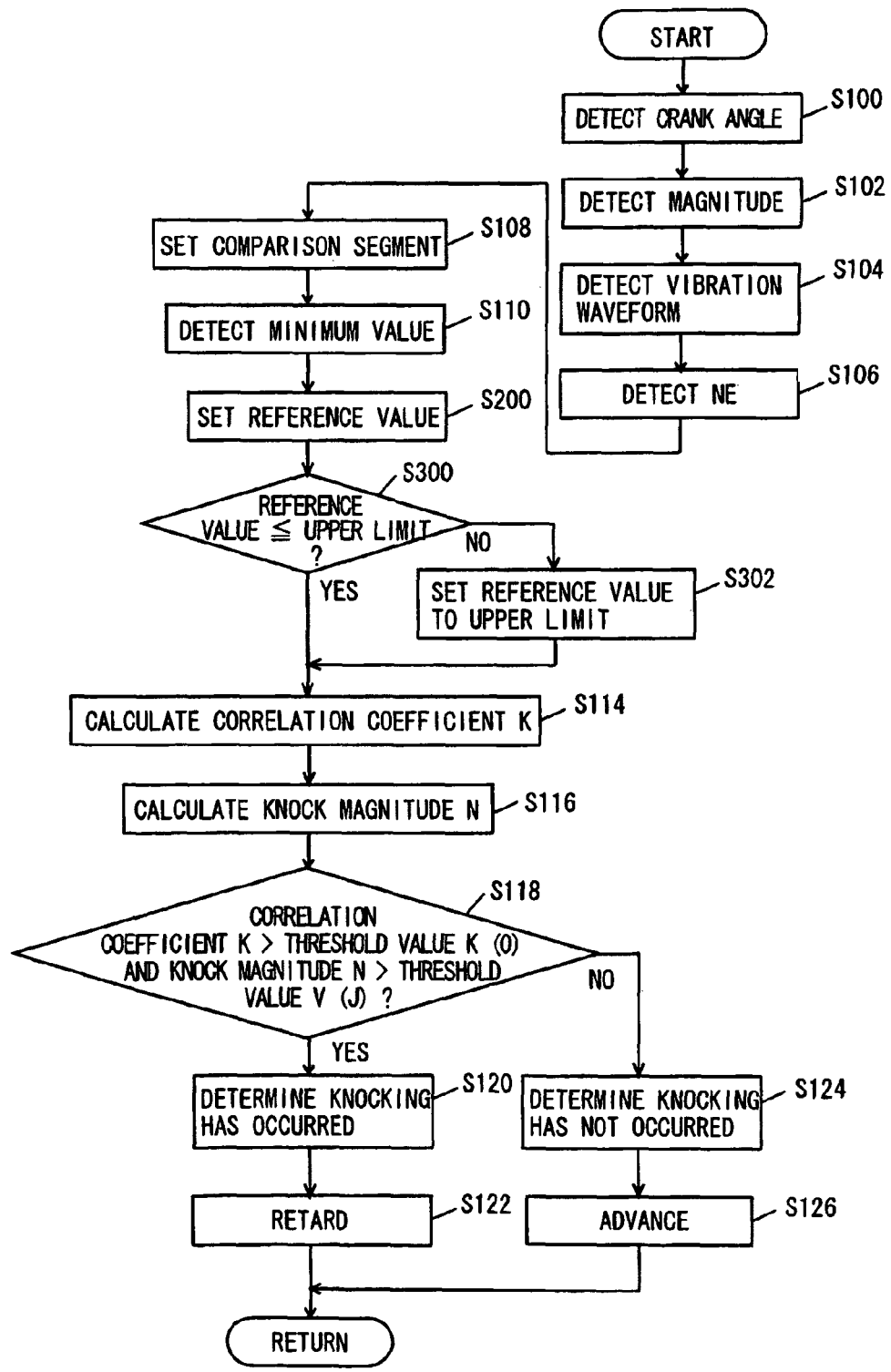
FIG. 21 is a flowchart showing a control structure of a program executed by the engine ECU that is the knocking determination device according to the third embodiment of the present invention.

Referring to FIG. 21, a description will be given of a control structure of a program executed by engine ECU 200 which is the knocking determination device in the present embodiment. The same process step as that of the above-described first or second embodiment is denoted by the same step number, and the detailed description thereof will not be repeated here.

In S300, engine ECU 200 determines whether or not the reference value is equal to or smaller than the upper limit. When the reference value is equal to or smaller than the upper limit (YES in S300), the process proceeds to S114. Otherwise (NO in S300), the process proceeds to S302. In S302, engine ECU 200 sets the reference value to the upper limit. In this way, the effects similar to those of the above-described first embodiment can be achieved.

Fourth Embodiment

In the following, a fourth embodiment of the present invention will be described. The present embodiment differs from the above-described first embodiment in that the reference value is set to the average of the minimum magnitude on the vibration waveform and the magnitude at a crank angle adjacent to the crank angle at which the minimum magnitude is present on the vibration waveform. Other features such as the configuration of engine 100 itself are identical to those of the above-described first embodiment. They functions identically as well. Therefore, the detailed description thereof will not be repeated here.

Figure 22:
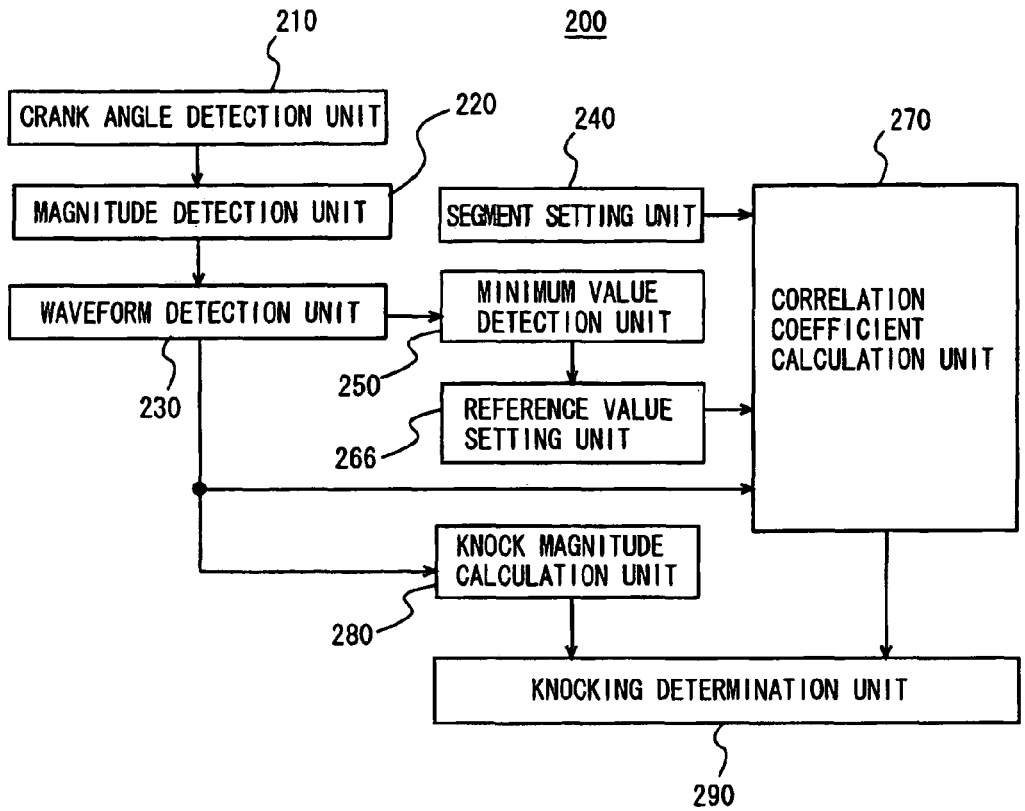
FIG. 22 is a functional block diagram of an engine ECU that is a knocking determination device according to a fourth embodiment of the present invention.

Referring to FIG. 22, the functions of engine ECU 200 that is a knocking determination device in the present embodiment will be described. The functions described below may be implemented by software or implemented by hardware. Any function identical to that of the above-described first embodiment is denoted by the same numeral, and the detailed description thereof will not be repeated here.

Figure 23:
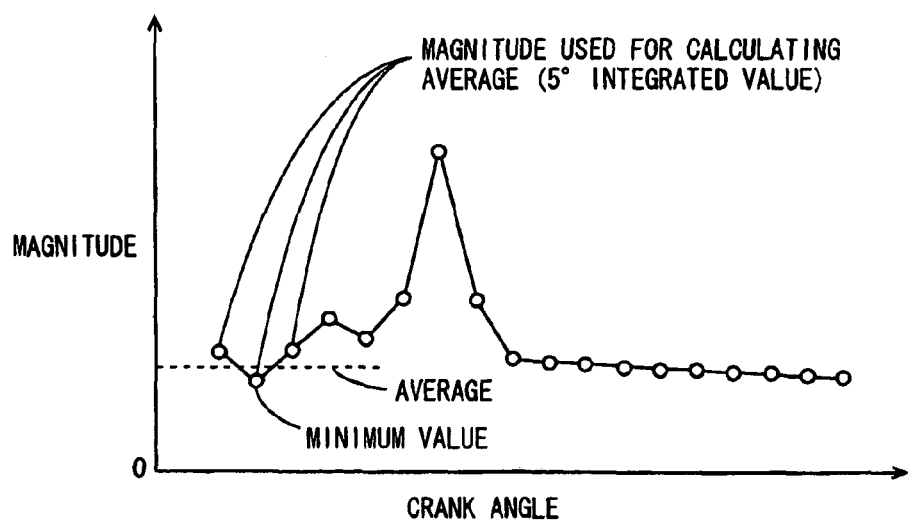
FIG. 23 is a chart showing an average calculated for setting a reference value.

In the present embodiment, a reference value setting unit 266 calculates, as shown in FIG. 23, the average of the minimum value of magnitude (5° integrated value) on the vibration waveform in fourth frequency band D and the magnitude at a crank angle adjacent to the crank angle at which the magnitude has the minimum value on the vibration waveform. For example, the average is calculated by dividing the 5° integrated value corresponding to the crank angle of 15° by "3." Further, reference value setting unit 266 sets the reference value to the calculated average. The calculation of the average and the setting of the reference value are performed in every ignition cycle. Namely, in a plurality of ignition cycles each, the average is calculated and the reference value is set.

Figure 24:
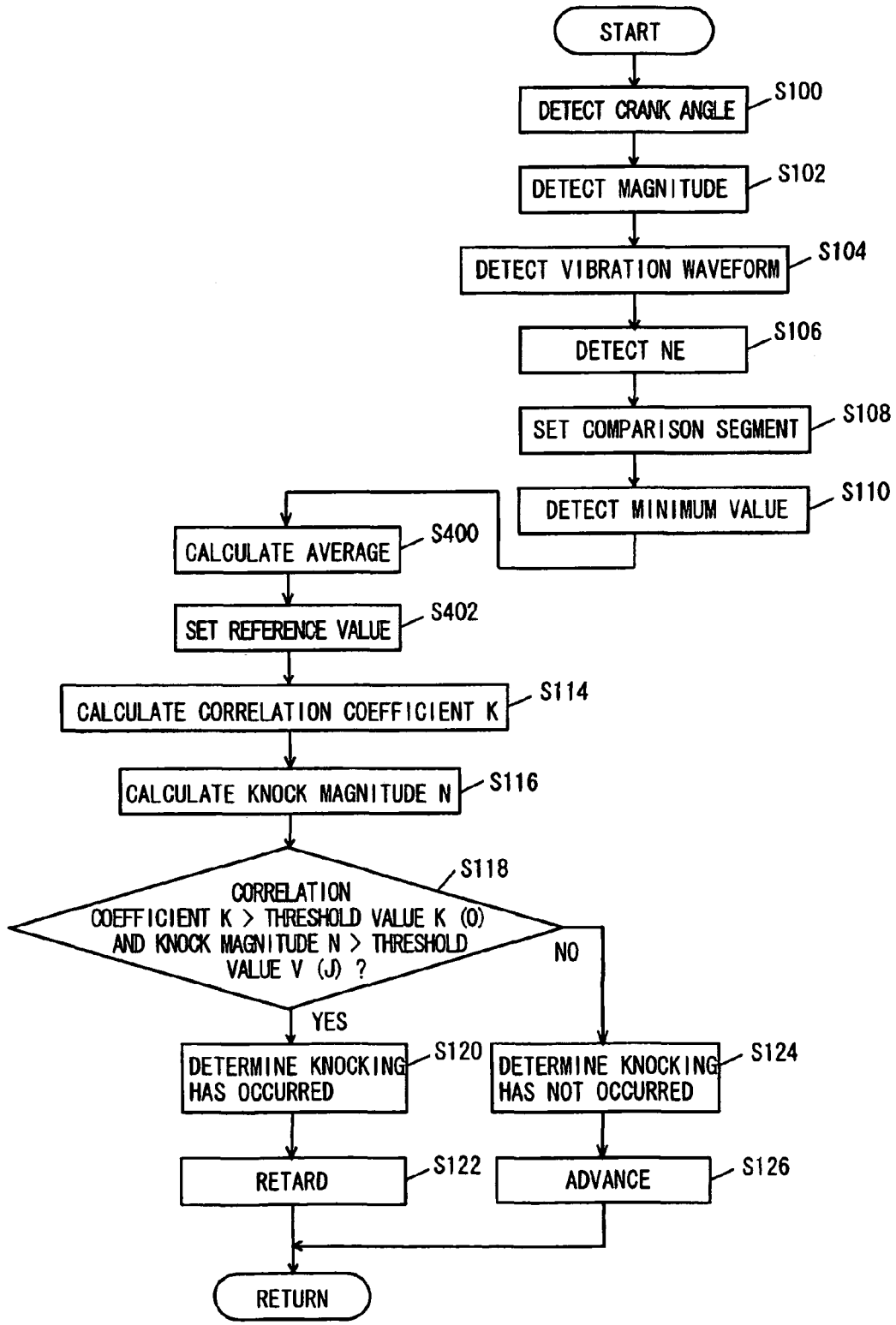
FIG. 24 is a flowchart showing a control structure of a program executed by the engine ECU that is the knocking determination device according to the fourth embodiment of the present invention.

Referring to FIG. 24, a description will be given of a control structure of a program executed by engine ECU 200 which is the knocking determination device in the present embodiment. Any step identical to that of the above-described first embodiment is denoted by the same step number. Therefore, the detailed description thereof will not be repeated here.

In S400, engine ECU 200 calculates the average of the minimum value of magnitude (5° integrated value) on the vibration waveform in fourth frequency band D and the magnitude at the crank angle adjacent to the crank angle at which the magnitude has the minimum value on the vibration waveform. In S402, engine ECU 200 sets the reference value to the calculated average. In this way, the effects similar to those of the above-described first embodiment can be achieved as well.

Fifth Embodiment

In the following, a fifth embodiment of the present invention will be described. The present embodiment differs from the above-described fourth embodiment in that the reference value is set based on the frequency distribution of averages of the magnitude (5° integrated value). Other features such as the configuration of engine 100 itself are identical to those of the above-described first embodiment. Respective functions are also identical. Therefore, the detailed description thereof will not be repeated here.

Figure 25:
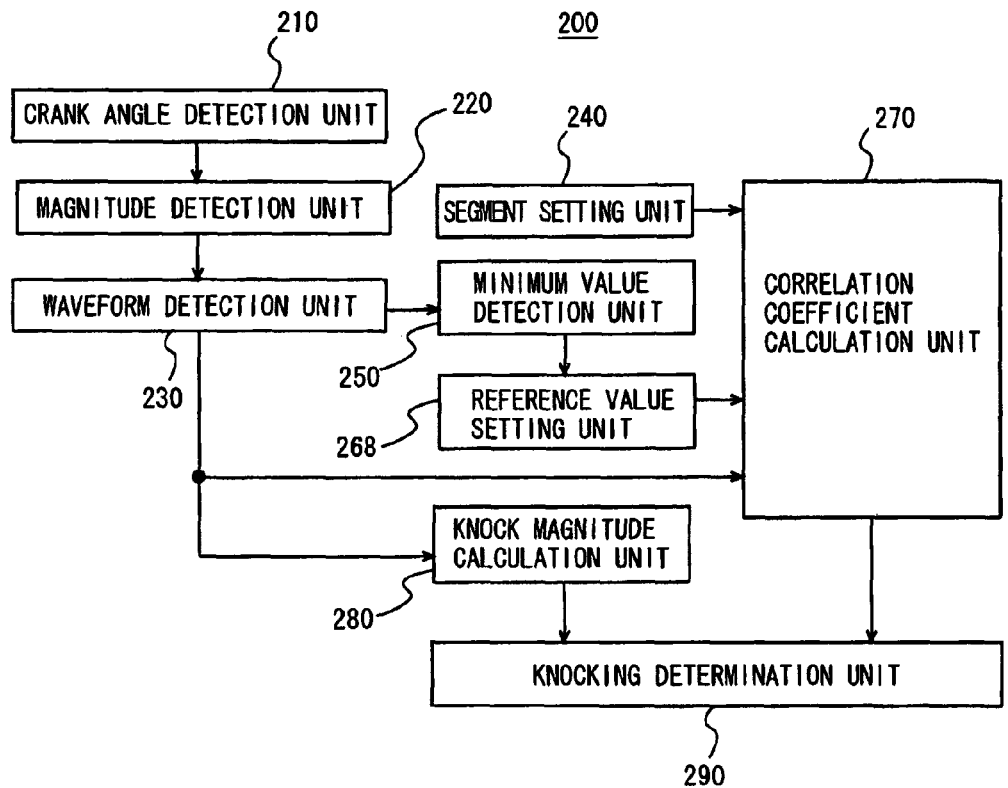
FIG. 25 is a functional block diagram of an engine ECU that is a knocking determination device according to a fifth embodiment of the present invention.
Figure 26:
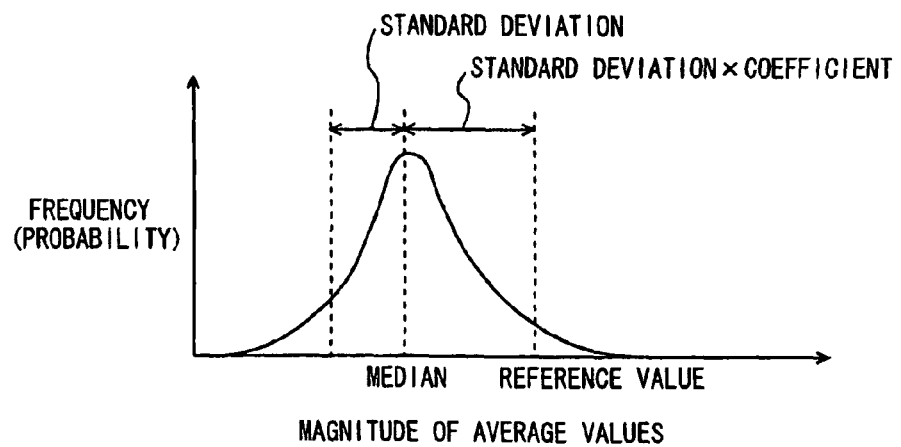
FIG. 26 is a chart showing a frequency distribution of averages.

Referring to FIG. 25, a description will be given of the functions of engine ECU 200 that is a knocking determination device in the present embodiment. The functions described below may be implemented by software or implemented by hardware. Here, any function identical to that of the above-described first or fourth embodiment is denoted by the same numeral. Therefore, the detailed description thereof will not be repeated here.

In the present embodiment, a reference value setting unit 268 calculates the average of the minimum value of magnitude (5° integrated value) on the vibration waveform in fourth frequency band D and the magnitude at the crank angle adjacent to the crank angle at which the magnitude has the minimum value on the vibration waveform. Further, reference value setting unit 268 sets the reference value to the value determined by adding the product of the standard deviation of the calculated averages and a coefficient to the median of the calculated averages. The coefficient is "2" for example. The averages used for setting the reference value refer to respective averages in 200 ignition cycles for example. When the reference value is set, the average undergoes a logarithmic transformation to be used. Therefore, the reference value which is set using the frequency distribution undergoes an inverse logarithmic transformation to be used.

Figure 27:
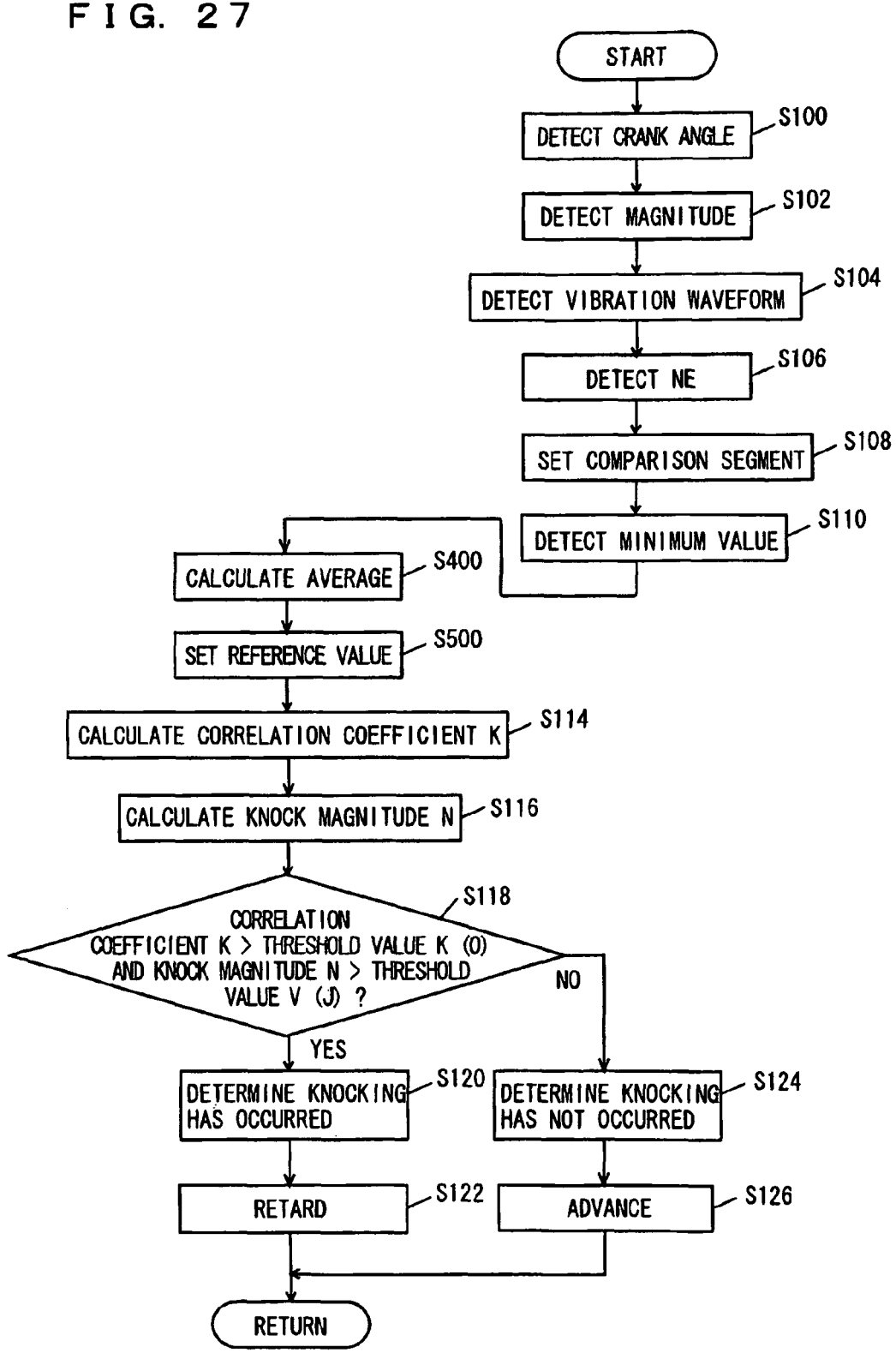
FIG. 27 is a flowchart showing a control structure of a program executed by the engine ECU that is the knocking determination device according to the fifth embodiment of the present invention.

Referring to FIG. 27, a description will be given of a control structure of a program executed by engine ECU 200 which is the knocking determination device in the present embodiment. Here, the same process steps in the preset embodiment and the above-described first or fourth embodiment are denoted by the same step number. Therefore, the detailed description thereof will not be repeated here.

In S500, engine ECU 200 sets the reference value to the value determined by adding the product of the standard deviation of the averages and a coefficient to the median of the averages. In this way, the effects similar to those of the first embodiment can be achieved as well.

Other Embodiments

Figure 28:
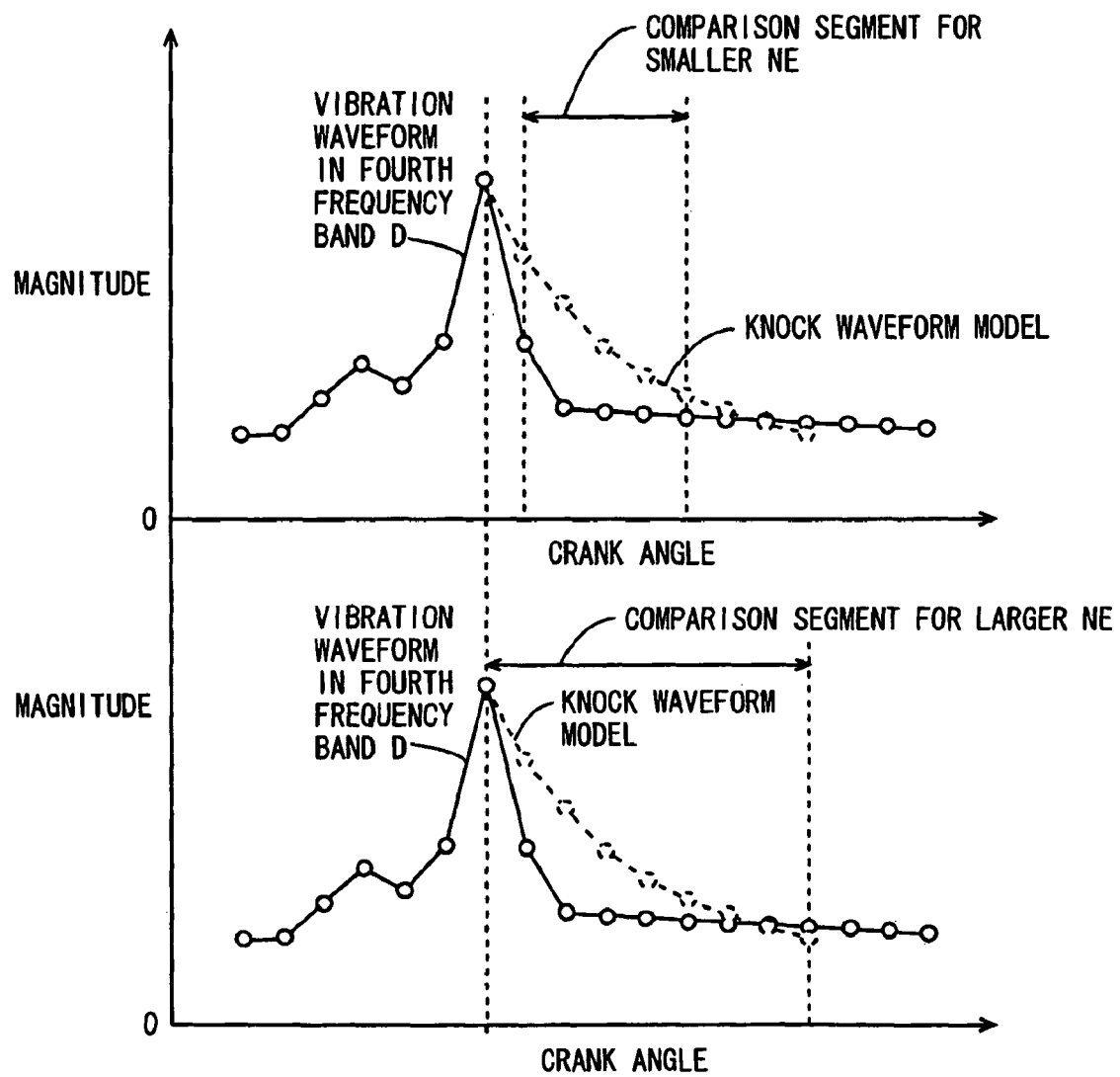
FIG. 28 is a (second) chart showing a comparison segment where a vibration waveform and a knock waveform model are compared with each other.

A constant value may be used as the reference value. Moreover, as shown in FIG. 28, the comparison segment may be set such that a crank angle at which the magnitude has the maximum value is out of the comparison segment.

It should be construed that embodiments disclosed above are by way of illustration in all respects, not by way of limitation. It is intended that the scope of the present invention is defined by claims, not by the description above, and includes all modifications and variations equivalent in meaning and scope to the claims.

The invention claimed is:
1. A knocking determination device for an internal combustion engine, comprising:
a crank position sensor (306) detecting a crank angle of said internal combustion engine (100);
a knock sensor (300) detecting a magnitude of vibration of said internal combustion engine (100), said magnitude being associated with a crank angle; and
an operation unit (200),
said operation unit (200) detecting a waveform of vibration in a first interval of crank angle, based on the magnitude of vibration of said internal combustion engine (100),
said operation unit (200) calculating a first value based on a difference between a magnitude on said detected waveform and a magnitude on a waveform model determined in advance as a reference waveform of vibration of said internal combustion engine (100), in a second interval of crank angle,
said operation unit (200) calculating a second value such that the second value is smaller as the number of revolutions of an output shaft of, said internal combustion engine (100) is smaller,
said operation unit (200) calculating a third value based on said first value and said second value, and said operation unit (200) determining whether or not knocking has occurred in said internal combustion engine (100), based on said third value.

2. The knocking determination device for the internal combustion engine according to claim 1, wherein
said operation unit (200) sets said second interval such that said second interval is smaller as the number of revolutions of the output shaft of said internal combustion engine (100) is smaller.

3. The knocking determination device for the internal combustion engine according to claim 1, wherein
said operation unit (200) calculates said first value by summing differences that are each a difference between the magnitude on said detected waveform and the magnitude on said waveform model, in said second interval,
in a case where the number of revolutions of the output shaft of said internal combustion engine (100) is a first number of revolutions, said operation unit (200) calculates said second value by summing values each determined by subtracting a positive reference value from the magnitude on said waveform model, in said second interval and, in a case where the number of revolutions of the output shaft of said internal combustion engine (100) is a second number of revolutions larger than said first number of revolutions, said operation unit (200) calculates said second value by summing magnitudes on said waveform model in said second interval,
said operation unit (200) calculates said third value by dividing said first value by said second value, and
in a case where said third value is smaller than a predetermined value, said operation unit (200) determines that knocking has occurred in said internal combustion engine (100).

4. The knocking determination device for the internal combustion engine according to claim 3, wherein
said operation unit (200) detects a minimum value of magnitude on said detected waveform, and
said operation unit (200) sets said reference value to the minimum value of magnitude on said detected waveform.

5. The knocking determination device for the internal combustion engine according to claim 3, wherein
said operation unit (200) detects respective minimum values of magnitude in a plurality of ignition cycles, said minimum values are each a minimum value of magnitude on said detected waveform, and
said operation unit (200) sets said reference value to a value determined by adding a product of a standard deviation of said minimum values and a coefficient to a median of said minimum values.

6. The knocking determination device for the internal combustion engine according to claim 5, wherein
said operation unit (200) limits said reference value to not more than a predetermined value.

7. The knocking determination device for the internal combustion engine according to claim 3, wherein
said operation unit (200) calculates an average of a minimum value of magnitude on said detected waveform and a magnitude at a crank angle adjacent to a crank angle at which said minimum value of magnitude is present on said detected waveform, and
said operation unit (200) sets said reference value to said average.

8. The knocking determination device for the internal combustion engine according to claim 3, wherein
said operation unit (200) calculates respective averages in a plurality of ignition cycles, said averages are each an average of a minimum value of magnitude on said detected waveform and a magnitude at a crank angle adjacent to a crank angle at which said minimum value of magnitude is present on said detected waveform, and
said, operation unit (200) sets said reference value to a value determined by adding a product of a standard deviation of said averages and a coefficient to a median of said averages.

9. The knocking determination device for the internal combustion engine according to claim 3, wherein
said reference value is a constant value.

10. A knocking determination method for an internal combustion engine, comprising the steps of:
detecting a crank angle of said internal combustion engine (100);
detecting a magnitude of vibration of said internal combustion engine (100), said magnitude being associated with a crank angle;
detecting a waveform of vibration in a first interval of crank angle, based on the magnitude of vibration of said internal combustion engine (100);
calculating a first value based on a difference between a magnitude on said detected waveform and a magnitude on a waveform model determined in advance as a, reference waveform of vibration of said internal combustion engine (100), in a second interval of crank angle;
calculating a second value such that the second value is smaller as the number of revolutions of an output shaft of said internal combustion engine (100) is smaller;
calculating a third value based on said first value and said second value; and
determining whether or not knocking has occurred in said internal combustion engine (100), based on said third value.

11. The knocking determination method for the internal combustion engine according to claim 10, further comprising the step of setting said second interval such that said second interval is smaller as the number of revolutions of the output shaft of said internal combustion engine (100) is smaller.

12. The knocking determination method for the internal combustion engine according to claim 10, wherein
said step of calculating the first value includes the step of calculating said first value by summing differences that are each a difference between the magnitude on said detected waveform and the magnitude on said waveform model, in said second interval,
said step of calculating the second value includes the step of calculating said second value by summing values each determined by subtracting a positive reference value from the magnitude on said waveform model in said second interval, in a case where the number of revolutions of the output shaft of said internal combustion engine (100) is a first number of revolutions, and calculating said second value by summing magnitudes on said waveform model in said second interval, in a case where the number of revolutions of the output shaft of said internal combustion engine (100) is a second number of revolutions larger than said first number of revolutions,
said step of calculating the third value includes the step of calculating said third value by dividing said first value by said second value, and
said step of determining whether or not knocking has occurred includes the step of determining that knocking has occurred in said internal combustion engine (100) in a case where said third value is smaller than a predetermined value.

13. The knocking determination method for the internal combustion engine according to claim 12 further comprising the steps of:
    detecting a minimum value of magnitude on said detected waveform; and
    setting said reference value to the minimum value of magnitude on said detected waveform.

14. The knocking determination method for the internal combustion engine according to claim 12, further comprising the steps of:
    detecting respective minimum values of magnitude in a plurality of ignition cycles, said minimum values are each a minimum value of magnitude on said detected waveform; and
    setting said reference value to a value determined by adding a product of a standard deviation of said minimum values and a coefficient to a median of said minimum values.

15. The knocking determination method for the internal combustion engine according to claim 14, further comprising the step of limiting said reference value to not more than a predetermined value.

16. The knocking determination method for the internal combustion engine according to claim 12, further comprising the steps of:
    calculating an average of a minimum value of magnitude on said detected waveform and a magnitude at a crank angle adjacent to a crank angle at which said minimum value of magnitude is present on said detected waveform; and
    setting said reference value to said average.

17. The knocking determination method for the internal combustion engine according to claim 12, further comprising the steps of:
    calculating respective averages in a plurality of ignition cycles, said averages are each an average of a minimum value of magnitude on said detected waveform and a magnitude at a crank angle adjacent to a crank angle at which said minimum value of magnitude is present on said detected waveform; and
    setting said reference value to a value determined by adding a product of a standard deviation of said averages and a coefficient to a median of said averages.

18. The knocking determination method for the internal combustion engine according to claim 12, wherein
    said reference value is a constant value.

19. A knocking determination device for an internal combustion engine, comprising:
    means (306) for detecting a crank angle of said internal combustion engine (100);
    means (300) for detecting a magnitude of vibration of said internal combustion engine (100), said magnitude being associated with a crank angle;
    means (200) for detecting a waveform of vibration in a first interval of crank angle, based on the magnitude of vibration of said internal combustion engine (100);
    first calculation means (200) for calculating a first value based on a difference between a magnitude on said detected waveform and a magnitude on a waveform model determined in advance as a reference waveform of vibration of said internal combustion engine (100), in a second interval of crank angle;
    second calculation means (200) for calculating a second value such that the second value is smaller as the number of revolutions of an output shaft of said internal combustion engine (100) is smaller;
    third calculation means (200) for calculating a third value based on said first value and said second value; and
    determination means (200) for determining whether or not knocking has occurred in said internal combustion engine (100), based on said third value.

20. The knocking determination device for the internal combustion engine according to claim 19, further comprising means (200) for setting said second interval such that said second interval is smaller as the number of revolutions of the output shaft of said internal combustion engine (100) is smaller.

21. The knocking determination device for the internal combustion engine according to claim 19, wherein
    said first calculation means (200) includes means for calculating said first value by summing differences that are each a difference between the magnitude on said detected waveform and the magnitude on said waveform model, in said second interval,
    said second calculation means (200) includes means for calculating said second value by summing values each determined by subtracting a positive reference value from the magnitude on said waveform model in said second interval, in a case where the number of revolutions of the output shaft of said internal combustion engine (100) is a first number of revolutions, and calculating said second value by summing magnitudes on said waveform model in said second interval, in a case where the number of revolutions of the output shaft of said internal combustion engine (100) is a second number of revolutions larger than said first number of revolutions,
    said third calculation means (200) includes means for calculating said third value by dividing said first value by said second value, and
    said determination means (200) includes means for determining that knocking has occurred in said internal combustion engine (100), in a case where said third value is smaller than a predetermined value.

22. The knocking determination device for the internal combustion engine according to claim 21, further comprising:
    means (200) for detecting a minimum value of magnitude on said detected waveform; and
    means (200) for setting said reference value to the minimum value of magnitude on said detected waveform.

23. The knocking determination device for the internal combustion engine according to claim 21, further comprising:
    means (200) for detecting respective minimum values of magnitude in a plurality of ignition cycles, said minimum values are each a minimum value of magnitude on said detected waveform; and
    means (200) for setting said reference value to a value determined by adding a product of a standard deviation of said minimum values and a coefficient to a median of said minimum values.

24. The knocking determination device for the internal combustion engine according to claim 23, further comprising means (200) for limiting said reference value to not more than a predetermined value.

25. The knocking determination device for the internal combustion engine according to claim 21, further comprising:
    means (200) for calculating an average of a minimum value of magnitude on said detected waveform and a magnitude at a crank angle adjacent to a crank angle at which said minimum value of magnitude is present on said detected waveform; and means (200) for setting said reference value to said average.

26. The knocking determination device for the internal combustion engine according to claim 21, further comprising:
means (200) for calculating respective averages in a plurality of ignition cycles, said averages are each an average of a minimum value of magnitude on said detected waveform and a magnitude at a crank angle adjacent to a crank angle at which said minimum value of magnitude is present on said detected waveform; and
means (200) for setting said reference value to a value determined by adding a product of a standard deviation of said averages and a coefficient to a median of said averages.

27. The knocking determination device for the internal combustion engine according to claim 21, wherein
said reference value is a constant value.

* * * * *